United States Patent [19]
Ettl et al.

[11] Patent Number: 5,946,662
[45] Date of Patent: *Aug. 31, 1999

[54] METHOD FOR PROVIDING INVENTORY OPTIMIZATION

[75] Inventors: Markus Ettl, Ossining; Gerald Eugene Feigin, Scarborough; Grace Yuh-Jiun Lin, Chappaqua; David Da-Wei Yao, Yorktown Heights, all of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/625,455

[22] Filed: Mar. 29, 1996

[51] Int. Cl.$^6$ .................................................. G06F 153/00
[52] U.S. Cl. .................................... 705/8; 705/14; 705/22
[58] Field of Search .................................... 705/8, 28, 10, 705/14, 29, 22; 364/408.1, 408.05, 488.09, 468.13

[56] References Cited

U.S. PATENT DOCUMENTS

| | | | |
|---|---|---|---|
| 5,229,948 | 7/1993 | Wei et al. | 364/468.05 |
| 5,287,267 | 2/1994 | Jayaraman | 364/468.05 |
| 5,295,065 | 3/1994 | Chapman et al. | 364/468.14 |
| 5,537,313 | 7/1996 | Pirelli | 705/8 |
| 5,611,051 | 3/1997 | Pierelli | 705/8 |
| 5,819,232 | 10/1998 | Shipman | 705/8 |

OTHER PUBLICATIONS

Svoronos, A. et al, Estimating the performance of multi-level inventory systems. Operations Research 36 (1988) 57–72.

Svoronos, A. et al, Evaluation of one–for–one replenishment policies for multiechelon inventory systems. Management Science 37 (1991), 68–83.

Graves, S., A multi–echelon inventory model for a repairable item with one for–one replenishment. Management Science 31 (1985) 1247–1256.

Lee, H. et al, Material Management in decentralized supply chains, Operations Research 41 (1986) 835–847.

Lee, H. et al, Operating characteristics of a two–echelon inventory system for repairable and consumable items under batch ordering and shipment policy. Naval Research Logistics 34 (1987) 365–380.

Lee, H. et al, Two–parameter approximations for multi–echelon repairable inventory models with batch ordering policy. IIE Transactions 19 (1987) 140–149.

Muckstadt, J., A model for a multi–item, multi–echelon, multi–indenture inventory system. Management Science 20 (1973), 472–481.

Schwarz, L. et al, Fill–rate optimization in a one–warehouse n–identical retailer distribution system, Management Science 31 (1985) 488–498.

Sherbrooke, C. Vari–Metric: Improved approximations for multi–indenture, multi–echelon availability models. Operations Research 34 (1986) 311–319.

Primary Examiner—Allen R. MacDonald
Assistant Examiner—Romain Jeanty
Attorney, Agent, or Firm—Scully, Scott, Murphy & Presser; Stephen C. Kaufman, Esq.

[57] ABSTRACT

A method for providing inventory optimization for levels of products in a complex supply chain network for multiple internal supplier or manufacturer locations and external distributor or retailer locations. The invention constructs a representative supply chain network model to indicate the flow of products between internal and external locations, it determines inventory levels and fill rates to meet the service level requirements, calculates a total inventory cost for all products in the network, and optimizes the fill rates based on estimated gradient information of the total inventory cost.

19 Claims, 5 Drawing Sheets

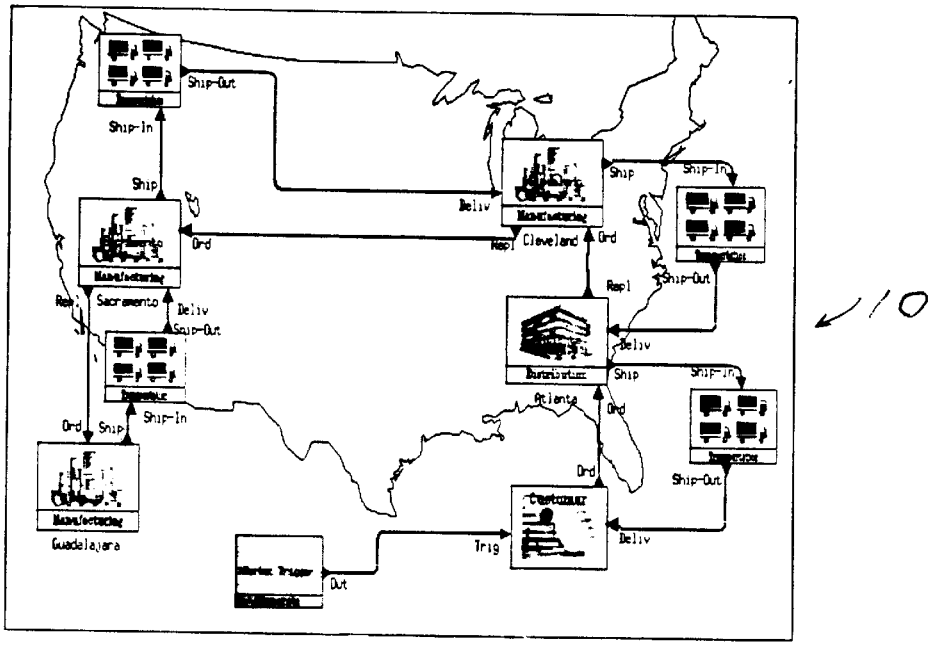
Figure 1. A Supply Chain Network
| Demand§ | Customer§ | Atl. Out§ | Atl. In§ | Cleve. Out§ | Cleve. In§ |
|---|---|---|---|---|---|
| Day 1§ | 2§ | 3§ | 4§ | 5§ | 5§ |
| Day 2§ | 3§ | 4§ | 5§ | 5§ | 6§ |
| Day 3§ | 4§ | 5§ | 5§ | 6§ | 5§ |
| Day 4§ | 5§ | 5§ | 6§ | 5§ | 2§ |
| Day 5§ | 5§ | 6§ | 5§ | 2§ | 3§ |
| Day 6§ | 6§ | 5§ | 2§ | 3§ | 4§ |
| Day 7§ | 5§ | 2§ | 3§ | 4§ | 5§ |
Figure 2. Demand Matrix

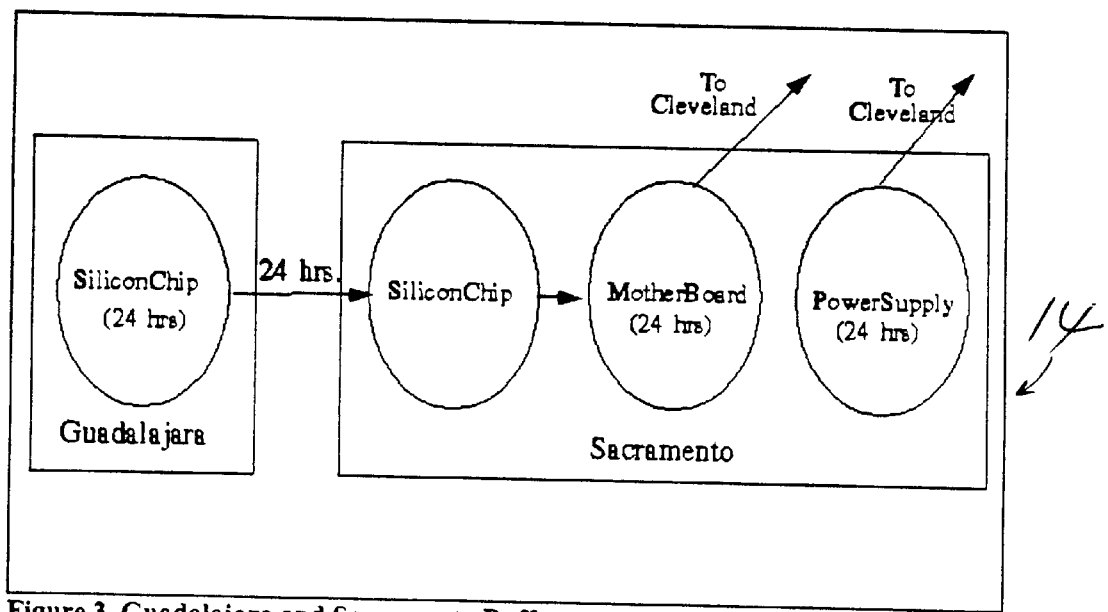
Figure 3. Guadalajara and Sacramento Buffers

| Location | Parts Inventory | Capital Inventory [in $] |
|---|---|---|
| Atlanta | 13.0 | 10500.0 |
| Cleveland | 15.0 | 3425.0 |
| Guadalajara | 1.0 | 50.0 |
| Sacramento | 23.0 | 1775.0 |
| Total | 52.0 | 15750.0 |

Estimated inventory turnovers : 90.4

← 16

Figure 4. Summary Results

| Part Number | Store | ROP | Parts Inventory | | |
|---|---|---|---|---|---|
| | | | WIP | On Hand | Total |
| ModelA | fld | | 0.0 | 4.0 | 4.0 |
| ModelA | o | 0 | 0.0 | 4.0 | 4.0 |
| ModelA | i | 5 | 4.0 | 1.0 | 5.0 |

B.2  Location Cleveland

← 18

| Part Number | Store | ROP | Parts Inventory | | |
|---|---|---|---|---|---|
| | | | WIP | On Hand | Total |
| ModelF | o | 5 | 4.0 | 1.0 | 5.0 |
| Motherboard | i | 5 | 4.0 | 1.0 | 5.0 |
| PowerSupply | i | 5 | 4.0 | 1.0 | 5.0 |

Figure 5. Parts Inventory Statistics

C.1  Location Atlanta

|  |  | Unit Cost [in $] | | Capital Inventory [in $] | | |
|---|---|---|---|---|---|---|
| Part Number | Store | WIP | On Hand | WIP | On Hand | Total |
| ModelA | fld |  | 1000.0 | 0.0 | 4000.0 | 4000.0 |
| ModelA | o | 750.0 | 1000.0 | 0.0 | 4000.0 | 4000.0 |
| ModelA | i | 500.0 | 500.0 | 2000.0 | 500.0 | 2500.0 |

C.2  Location Cleveland

|  |  | Unit Cost [in $] | | Capital Inventory [in $] | | |
|---|---|---|---|---|---|---|
| Part Number | Store | WIP | On Hand | WIP | On Hand | Total |
| ModelA | o | 387.5 | 500.0 | 1550.0 | 500.0 | 2050.0 |
| Motherboard | i | 200.0 | 200.0 | 800.0 | 200.0 | 1000.0 |
| PowerSupply | i | 75.0 | 75.0 | 300.0 | 75.0 | 375.0 |

Figure 6. Capital Inventory Statistics

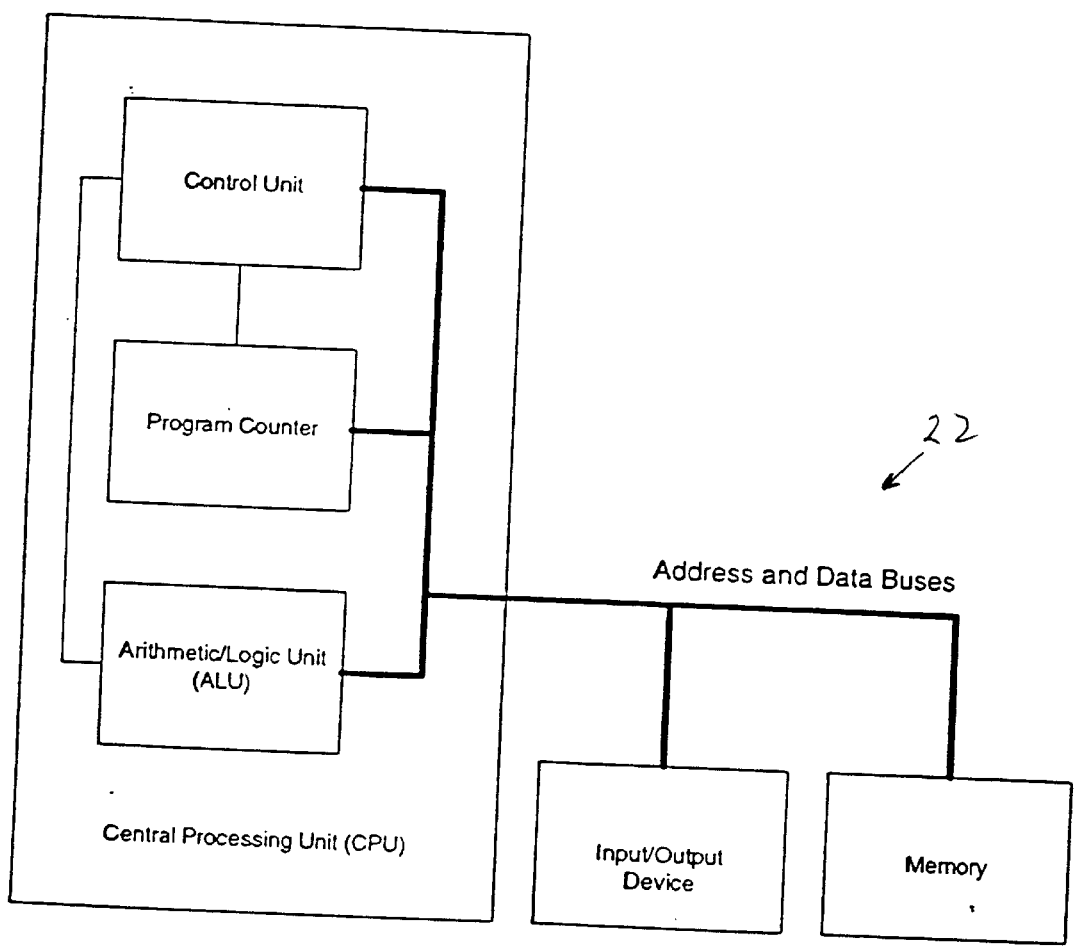
Figure 7 Schematic of a Canonical CPU

METHOD FOR PROVIDING INVENTORY OPTIMIZATION

FIELD OF THE INVENTION

This invention relates to a method for providing inventory optimization.

1 INTRODUCTION TO THE INVENTION

1.1 OVERVIEW

A supply chain can be viewed as a global network of suppliers, fabrication sites, assembly locations, distribution centers, and customer locations through which components and products flow. The bills of material for products and components may consist of multiple levels, meaning that raw components may be assembled into more complex components or sub-assemblies, these sub-assemblies further combined to create yet more complex sub-assemblies and so on until the final level bill of materials is brought together to manufacture the end products (i.e., finished goods).

A supply chain is driven by customer orders for finished products. In general, the times at which customer orders are received form a non-stationary stochastic process. The non-stationarity may be due to product life cycles, seasonal variations in demand, and economic conditions. Associated with each customer order is a request date which is the date by which the customer would like to receive the complete order. The service level is loosely defined as the fraction of customer orders which are received by their request dates.

Asset managers of large manufacturing enterprises, such as those found in the computer, electronics, and auto industries, oversee extremely large supply chains involving multiple products each with complex multi-level bills of material. These asset managers have the responsibility of determining the appropriate inventory levels in the form of components and finished goods to hold at each level of a supply chain in order to guarantee specified end customer service levels. Given the size and complexity of these supply chains, a common problem for these asset managers is not knowing how to quantify the tradeoff between service levels and the investment in inventory required to support those service levels. The problem is made difficult by the fact that the supply chains these asset managers oversee are dynamic: products have short lifetimes, new products are introduced frequently, customer demand is erratic and non-stationary, and service level requirements may change over time. The dynamic nature of complex supply chains means that the tradeoff between service level and inventory investment changes over time, implying that asset managers must continually reevaluate this tradeoff so that they can make informed and timely decisions about inventory levels and service targets.

1.2 SUMMARY OF THE INVENTION

In this Invention, we describe a model of complex supply chains that is appropriate for asset managers to use in quantitatively assessing the inventory-service level tradeoff. The model is developed with several considerations in mind. First, it is intended as a strategic model that can be used on an on-going basis. As such, it must strike a balance between capturing the complex dynamics of a large supply chain and yet not focusing too much attention on operational issues. Second, the model is preferably to be used for both performance analysis and optimization. In the former case, a user first specifies inventory policies throughout the network, and then an analysis is performed resulting in estimates of end-customer service levels, fill rates at each stocking location in the supply chain, and the avera ge dollar value of inventory held in the network. In the case of optimization, the user specifies end-customer service levels and then an analysis is performed which finds the inventory policy which minimizes inventory investment and meets the specified service levels. Third, the model must deal with the dynamic aspects of the supply chain. Finally, the analysis of the supply chain, whether in performance analysis or optimization mode, must be performed quickly, so that frequent what-if analysis by asset managers is feasible.

We model all sites in a supply chain as capable of building some set of products, whether finished goods, components, or sub-assemblies, which are shipped to a set of downstream customers, whether end customers or other sites in the network. Associated with each site in the network and each product it can produce is a single level bill of material which contains the set of components required to produce a single item of the product. At each site, storage areas, which we refer to as "stores", exist to hold both components that appear on the single level BOMs and finished products. The component stores are referred to as input stores; the finished product stores are referred to as output stores. Thus, we view each site in the network as a collection of input and output stores. Every store at a site, whether input or output, stocks a unique stock keeping unit (sku). As items flow through this network they move from output store to input store to output store until the end customer is reached.

Our basic modeling approach assumes a distributed inventory control mechanism whereby each stocking location (store) in the network operates according to a continuous review one-for-one base-stock control policy, also known as an (s, s−1) policy. We model each store as uncapacitated, meaning that the replenishment lead time of any store, given that there are no stock-outs at up stream stores, is a random variable independent of the number of outstanding orders. The base-stock control preferably requires specifying a base-stock level, or reorder point, at each store. We formulate our model in terms of these base-stock levels. To analyze performance, we input these base-stock levels and then analyze the end-customer service levels as well as fill rates and inventory levels throughout the network. To perform optimization, we formulate a constrained non-linear optimization problem. Specifically, our objective is to minimize a function of base-stock levels which closely approximates the total average dollar value of inventory in the network. The service levels required for end customers serve as constraints. The optimization is preferably carried out using the conjugate gradient method, where we make use of gradient estimates obtained analytically.

To handle the dynamic nature of supply chains and in particular the non-stationarity of demand, we adopt a rolling horizon point of view. That is, as time evolves and new information becomes available, the decision variables, namely the reorder points, and performance measures, change as well. In most of the subsequent sections, we implicitly place ourselves at the beginning of an arbitrary time interval and derive our calculations assuming this to be the current time. While the focus of this invention is on performance analysis and optimization at some fixed point in time, we emphasize that in a dynamic environment, the calculations would need to be updated on a regular basis with the latest available information.

Our model assumes a one-for-one replenishment mechanism. Consequently, we do not address the problem of selecting order sizes at each location nor, for that matter, do we address many operational aspects of inventory management in supply chains. Our goal in developing this model is to provide a strategic analysis tool for asset managers to assess total required inventory investment required to meet different service level specifications. We take the view that this model will be used by asset managers as a decision support tool to make recommendations on the appropriate target inventory levels at each store in a supply chain. These target levels will then be used as one of several inputs to determine specific inventory policies implemented at each location.

1.3 LITERATURE REVIEW

The literature relating to the type of model we examine is extensive. Our intent here is not to provide an exhaustive review of relevant work; rather, we want to situate our work with respect to prior research that relates to our work in terms of motivation, model definition, results, and advantages.

Axsäter [1] provides a good description of models and algorithms for the analysis of continuous review policies in multi-echelon networks. The classic model of a continuous review, multi-echelon inventory system is METRIC (Sherbrooke [14]), developed for the U.S. Air Force as a planning tool for controlling inventory of reparable items. The model consists of two echelons, the lower one consisting of n identical bases or stocking locations, the upper one consisting of a single depot or warehouse which supplies the stocking locations with repaired parts. The original model considered a single item, i.i.d. lead times, one-for-one replenishment, no capacity constraints, and a stationary compound Poisson demand process. The objective of the model was to identify stocking policies at the bases and the depot to minimize backorders at the base level subject to a constraint on inventory investment. Subsequent work has extended the model in various ways. MOD-METRIC (Muckstadt [11]) extended the model to handle multiple items and multi-indenture. VARI-METRIC (Sherbrooke [15]) and Graves [6] proposed methods for improving the model's accuracy. Lee and Moinzadeh [8] [9] allowed for batch ordering and shipping. Deuermeyer and Schwartz [4] and Svoronos and Zipkin [16] developed simplified approaches based on decomposition. Svoronos and Zipkin [17] considered a model with non-overtaking repair (or transit) times as opposed to the i.i.d. assumption used elsewhere. Based on their approximation model, Schwarz, Deuermeyer and Badinelli [13] formulate and solve an optimization problem, not unlike ours, in which the objective is to maximize system fill-rate subject to a constraint on system safety stock.

The arborescent structure of the networks treated by METRIC and related models are appropriate for distribution networks. However, the supply chains we are modeling involve not only distribution but assembly, in which multiple components are required for the production of one part. Extensions to treat such networks are not straightforward. See Ernst and Pyke [5] and Cohen and Lee [3] for research in this direction.

Perhaps the work most closely related to ours is Lee and Billington [7]. Some differences and similarities in their model formulation are worth pointing out. First, their basic single store model is based on periodic review while we use a continuous review model. This difference is of little consequence. Second, they calculate average production lead times based on user input manufacturing characteristics, such as throughput, flow time, down time, and hours per week of available capacity. Our production lead times are specified directly. However, both models are essentially uncapacitated in that production lead times are not a function of the number of outstanding orders. Third, their model appears to be aimed principally at performance analysis, not optimization. As the authors state, "we have used a simple search heuristic to look for the 'best' combination of service level targets at different sites of the supply chain to support desired end-customer service targets. This is clearly an area for further research." In this respect, our work can be viewed as an extension of their model in that we have focused considerable attention on solving an explicit constrained optimization problem preferably by making use of analytically derived gradient estimates. Fourth, the way in which we model lead times for assembly is quite similar, namely that there is some nominal lead time which is augmented by the possibility that any one of the input components can be out of stock. Finally, both models pay close attention to capturing the interdependence of base-stock levels at different stores and how this interdependence affects overall system performance.

1.4 THE INVENTION

We now disclose a novel method suitable for providing minimum inventory level to hold in a complex supply chain in order to meet end customer service level requirements. The novel method comprises the steps of:

(1) identifying from a user input:
   (a) a supply chain network topology comprising a plurality of linked part nodes including internal nodes and external nodes dedicated to external customers;
   (b) nomimal lead times defined for each of said part nodes;
   (c) a demand comprising an aggregate of part nodes;
   (d) a service level requirement for the demand;
(2) populating the demand from the external nodes to internal nodes and estimating the actual lead-time using the nominal lead-time and fill rate information of internal nodes;
(3) determining an inventory level using the actual lead-time and demand information for internal nodes;
(4) meeting the service level requirements by setting minimal inventory levels at each node that has external customer demand; and,
(5) applying optimization routine to reset the fill rates of the internal nodes and repeating steps 2 to 4 until the total inventory cost converges.

1.5 BRIEF DESCRIPTION OF THE DRAWING

The invention is illustrated in the accompanying drawing in which:

FIGS. 1–3 show a supply chain network, demand matrix, and buffer respectively in illustration of an example of the present invention;

FIGS. 4–6 show the implementation results—the summary results, parts inventory statistics, and capital inventory statistics respectively; and FIG. 7 shows a schematic of a canonical CPU suitable for realization of the present invention.

DETAILED DESCRIPTION OF THE INVENTION

The detailed description of the invention is organized as follows. In section §2, we define our model in detail. In subsequent sections, we describe the performance analysis algorithm (§3), the optimization problem (§4), the solution methodology including gradient estimates (§5), the shadow price information (§6), implementation issues (§7), demonstration (§8), and the machine realization of the present invention (§9).

2 The Supply Chain Model
2.1 Network Topology

We preferably model supply chain networks as a collection S of stocking locations, or stores, each of which stocks one type of sku. The sku in store i is denoted by sku(i). Stores are defined as either input or output. Each store $i \in S$ has a set of upstream stores, denoted by $S_{>i}$, by which we mean those stores which directly supply that store. In the case of input stores, we assume that the set of upstream stores contains exactly one output store. This means that each input store can obtain replenishments from only one supplier. In the case of output stores, we assume that the set of upstream stores is either empty, in which case it is considered a source store, or contains some number of input stores, which correspond to the elements in the one level bill of material for that store. The one level bill of material for output store i is specified in terms of usage counts, $u_{ji}$, $j \in S_{>i}$, $u_{ji}$ denotes the number of sku(j) needed to produce one unit of sku(i).

Each store $i \in S$ also has a set of downstream stores, denoted by $S_{i>}$, by which we mean those stores which i supplies directly. In the case of input stores, $S_{i>}$ consists of at least one output store. In the case of output stores, either $S_{i>}$ is empty, in which case it is defined as an end store, or it contains some number of input stores. The set of source stores is denoted by $S_I$ and the set of end stores by $S_O$.

From a graph theoretic point of view, the topology of our supply chain model consists of two disjoint sets of vertices (the input and output stores) connected by directed edges such that there is exactly one inward directed edge for each input vertex (single supplier), some set of output vertices have no inward directed edges (the source stores), some set of output vertices have no outward edge (the end stores) and, finally, there are no cycles. This is a directed, acyclic, bipartite graph.

2.2 Network Dynamics
2.2.1 Overview

While the base-stock model we use throughout our analysis is a continuous time model, we have implemented the model by discretizing time, where we have taken the basic time interval to be one day. As a result, all quantities dependent on time, such as lead time distributions and demand forecasts, are discretized according to the basic time interval. It is worth noting that our analysis can be easily modified to handle periodic review periods.

2.2.2 Base-Stock Control and Nominal Lead Times

As mentioned earlier, we assume that all stores follow a one-for-one base-stock control policy for managing inventory. Such a policy works as follows: When the on-hand plus on-order minus backorder inventory level (called the inventory position) at store i falls below some specified base-stock level threshold, $R_i(t)$, a replenishment order is placed. We have written the threshold as a function of the time, t, to indicate that it will vary over time. To ease notational burden, we write $R_i$ when there is no ambiguity.

In the case of input stores, a replenishment order is placed with its unique upstream output store (i.e. supplier). If the upstream output store has stock on-hand, it fills the order immediately and the sku is shipped to the input store. The shipping time constitutes the nominal lead time of the input store and is specified as a discrete time distribution. The lead time of store i is denoted by $L_i$. All orders place by store i have i.i.d. nominal lead times. If the upstream store has a stock-out, the order joins the backorder queue for that store. In the case of an output store, the replenishment order is really a production order whereby one sku of the output store is assembled from the skus of its upstream input stores, according to the one-level bill of material for that store. If all of the upstream input stores have stock on-hand, production is begun immediately and upon completion, the sku is placed in the output store. The production time constitutes the nominal lead time of the output store (also denoted by $L_i$) and is specified as a discrete time distribution. If any of the upstream input stores have a stock-out, the production order joins the backorder queue and is not executed until all parts needed for assembly are available.

The nominal lead time is distinct from, but related to, the actual lead time, $\tilde{L}_i$, which is the lead time taking into consideration the possibility of a stock-out at the upstream store(s). To be more specific, the actual lead time associated with a store is the difference between the time an order is placed by the store and the time the complete order arrives to the ordering store. Clearly the actual lead time (a random variable) is at least the nominal lead time but may be significantly more, depending on whether a stock-out occurs at any of its upstream stores.

2.2.3 End Customers, Demands, and Service Levels

We denote by M the set of all customer classes. Associated with customer class $m \in M$ are the store from which it demands finished goods, str(c), the transit time to deliver products from str(m) to the customer location, $T_m$, and the service level parameters, $\alpha_m$ and $\beta_m$. The service level parameter $\beta_m$ is a possibly random due date of an order from class m while $\alpha_m$ is the fraction of customers from class m that should have their orders filled within their due dates. If $W_m$ denotes the waiting time to receive an order for a typical class m customer, then the service constraint for class m customers is given by $$P[W_m \leq \beta_m] \geq \alpha_m.$$

Also associated with a customer class m is a forecasted demand stream, $\{D_m(1), D_m(2), \ldots\}$, which denotes the anticipated demand in days 1, 2, 3, ... by customer class m. Note that we are explicitly allowing for the possibility that demands are not stationary over time. Also, the demand for each period is modeled as a random variable defined on the non-negative integers. These customer demands give rise to effective demand streams at each store in the network, denoted by $D_i(1), D_i(2), D_i(3), \ldots$, which we define as follows. First, define the offset associated with customer class m as $$o_m := E[T_m]$$

Then for each end store $i \in S_o$, we define the effective demand stream as:

$$D_i(t) := \sum_{m: str(m)=i} D_m(o_m + t) \quad t = 1, 2, 3, \ldots$$

We proceed in a similar manner for all other stores in the network. Specifically, we define the offset of store i to be $$o_i := E[L_i] \forall i \in S$$

Then, for all stores $i \notin S_o$, define the effective demand streams as:

$$D_i(t) := \sum_{j \in S_{i>}} u_{ij} D_j(o_j + t) \quad t = 1, 2, 3, \ldots$$

Note that we assume that the demand streams for all customer classes are given for each period over the horizon under study. From this input data, we recursively calculate the effective demand streams at each store in the network, starting with the end stores and moving upstream to the source stores.

3 Performance Analysis

3.1 The Inventory-Queue Model

For each store i, we model it as an infinite-server queue, operated under a base-stock control rule. (Refer to Buzacott and Shanthikumar [2], Chapter 4, for general background materials for make-to-stock queues.) Specifically, we use the $M^X/G/\infty$ model, where arrivals follow a Poisson process with rate $\lambda_i$, and each arrival brings a batch of $X_i$ units (jobs). Jobs are processed individually, by an infinite pool of servers (so that all jobs are processed immediately on arrival, and there is no queue), and the processing times are iid, following a general distribution.

The system produces up to a target inventory (or, base stock) level of $R_i$ units. Any arrival brings in general a batch of orders, which is filled from and hence depletes the on-hand inventory, if any; otherwise, the order has to wait to be filled, in a back-order queue. Regardless, however, the order is processed immediately on arrival. In other words, any arriving order will trigger production (i.e., processing of orders), and the production will continue until the on-hand (surplus) inventory is built to the target level of $R_i$.

Let $\tilde{L}_i$ be the actual lead time at store i, i.e., the time it takes to process an order. When the store is a plant, this is the production time to produce the order; when the store is a distribution center, this is the transportation time to bring over the order. Note that this is not the time to fill the order, which could be zero when there is positive inventory. Also note that $\tilde{L}_i$ is in general larger than $L_i$, the nominal lead time, since the stores that supply store i could be out of stock, adding extra delays to the order in process at store i. The complete characterization of $\tilde{L}_i$ will be presented later. Here we first point out that $\tilde{L}_i$ represents the service time requirement of the jobs (orders) in the $M^X/G/\infty$ queue outlined above.

For the time being, assume demand to store i is stationary, and let $D_i$ denote the average number of orders per time unit (daily demand, for instance). The more general case is deferred to after the actual lead times are specified; see §3.5. Note that we have $E(D_i) = \lambda_i E(X_i)$, and $Var(D_i) = \lambda_i E(X_i^2)$; and that the variance expression follows from the batch (compound) Poisson arrivals. Let $N_i$ be the total number of jobs in the queue $M^X/G/\infty$ (in equilibrium). Following the results in Liu, Kashyap and Templeton [10], the mean and the variance of $N_i$ are as follows:

$$\mu_i := E(N_i) = \lambda_i E(X_i) E(\tilde{L}_i) = E(D_i) E(\tilde{L}_i), \quad (1)$$

$$\sigma_i^2 := Var(N_i) = E(N_i) + \lambda_i [E(X_i^2) - E(X_i)] \int_0^\infty \bar{F}_{\tilde{L}_i}^2(y) dy \quad (2)$$

$$= \mu_i + [Var(D_i) - E(D_i)] \int_0^\infty \bar{F}_{\tilde{L}_i}^2(y) dy,$$

where $F_{\tilde{L}i}(y) = 1 - \bar{F}_{\tilde{L}i}(y)$ denotes the distribution function of $\tilde{L}_i$.

Although the generating function of $N_i$ is available in [10], from which one can in principle derive the distribution of $N_i$, here we choose to simply approximate the distribution as normal with mean $\mu_i$ and variance $\sigma_i$ as derived above. This way, we can write $$N_i = \mu_i + \sigma_i Z, \quad (3)$$

where Z denotes the standard normal variate. Note that whereas the mean of $N_i$, $\mu_i$, is equal to the mean of demand over lead-time, the variance of $N_i$, $\sigma_i^2$, is not equal to the variance of demand over lead-time. (In fact, $\sigma_i^2$ is significantly less than the variance of demand over lead-time, as we shall explain later in §3.5.)

3.2 On-Hand Inventor and Back Orders

Let $I_i$ and $B_i$ be, respectively, the level of on-hand inventory and the number of backorders at store i. These relate to $N_i$ and $R_i$ through the following relations:

$$I_i = [R_i - N_i]^+, \quad B_i = [N_i - R_i]^+, \quad (4)$$

where $[x]^+ := \max\{x, 0\}$. In view of (3), we can write $$R_i = \mu_i + k_i \sigma_i, \quad (5)$$

where $k_i$ is a decision parameter, the safety factor. Then, $$E(B_i) = E[N_i - R_i]^+ = \sigma_i E[Z - k_i]^+ = \sigma_i \int_{k_i}^\infty (z - k_i) \phi(z) dz,$$

where $\phi(z) = \exp(-x^2/2)/\sqrt{(2\pi)}$ is the density function of Z. Denoting $$G(k_i) := \int_{k_i}^\infty (z - k_i) \phi(z) dz, \quad (6)$$

we have $$E(B_i) = \sigma_i G(k_i). \quad (7)$$

Similarly, letting $$H(k_i) := k_i + G(k_i) = \int_{-\infty}^{k_i} (k_i - z) \phi(z) dz, \quad (8)$$

we have $$E(I_i) = \sigma_i H(k_i). \quad (9)$$

Furthermore, we have $$E(I_i) - E(B_i) = \sigma_i [H(k_i) - G(k_i)] = k_i \sigma_i,$$

which also follows directly from (4):

$$I_i - B_i = R_i - N_i, \quad (10)$$

and applying expectation on both sides.

For future reference, we summarize below the properties of the functions G(x) and H(x) in (6) and (8). These properties are all easily verified from first principle.

(a) $G(x) = \phi(x) - x\bar{\Phi}(x)$ (note that $\phi'(x) = -x\phi(x)$); and $H(x) = \phi(x) + x\Phi(x)$. $G'(x) = -\bar{\Phi}(x)$, $H'(x) = \Phi(x)$, and $G''(x) = H''(x) = \phi(x)$.

(b) For all $x \in (-\infty, +\infty)$, $G(x) \geq 0$ and $H(x) \geq 0$; $G(x)$ is decreasing and $H(x)$ increasing, and both are convex. (Throughout, we use "increasing" and "decreasing" in the non-strict sense.)

(c) For $x >> 1$, $G(x) \approx 0$ and $G(-x) \approx x$, whereas $H(x) \approx x$ and $H(-x) \approx 0$.

3.3 Stockout Probability and Fill Rate

The stockout probability at store i, denoted $p_i$, is simply $$p_i := P[I_i = 0] = P[N_i \geq R_i] = P[Z \geq k_i] = \bar{\Phi}(k_i). \quad (11)$$

That is, $p_i$ is the proportion of time that the on-hand inventory at store i is zero.

The fill rate at store i, denoted $f_i$, is the proportion of customer orders that is filled on-hand inventory. Note that in case of batch orders, an order is "filled" only if its entirety is supplied by on-hand inventory. Let $\bar{f}_i := 1 - f_i$. Note that when $N_i < R_i$, the difference $R_i - N_i$ is on-hand inventory. Hence, conditioning upon $N_i$ and observing the PASTA property (Poisson Arriva Is See Time Averages; see [18]), we have $$\bar{f}_i = \sum_{n=0}^{R_i-1} P(N_i = n) P(X_i \geq R_i - N_i + 1) + P(N_i \geq R_i). \quad (12)$$

With the normal approximation on $N_i$, we have $$\bar{f}_i = \int_{-\infty}^{k_i} \phi(z) \bar{F}_{X_i}(k_i - z) dz + \bar{\Phi}(k_i), \quad (13)$$

where $F_{X_i}(\cdot) = 1 - \bar{F}_{X_i}(\cdot)$ denotes the distribution function of $X_i$. The difficulty is, in general we do not have access to the distribution function of $X_i$. To avoid this difficulty, we use the following heuristic argument. Note that whenever $N > R$, we will have a backorder queue of $N - R$ orders. Hence, in equilibrium, we can equate the rate of orders entering the backorder queue and the rate of orders leaving the backorder queue, to arrive at the following relation:

$$\lambda_i E(X_i) \overline{[E(\tilde{L}_i)]^{-1}} E[N_i | N_i > R_i] P[N_i > R_i]. \quad (14)$$

(When there are $N_i = n$ orders in processing, the rate of output is $n/[E(\tilde{L}_i)]$; conditioning on $N_i > R_i$ yields the right hand side above.) It is easy to verify that in the case of single-unit batches, i.e., $X_i \equiv 1$, the above yields $\bar{f}_i = p_i$, as expected from the M/G/∞ queue (i.e., arrivals see time averages).

Making use of the above relation, along with (1) and (6), we have $$\bar{f}_i = \mu_i^{-1} E[N_i | N_i > R_i] P[N_i > R_i] \quad (15)$$
$$= \mu_i^{-1} [E(N_i - R_i)^+ + R_i P(N_i > R_i)]$$
$$= \mu_i^{-1} [\sigma_i G(k_i) + (\mu_i + k_i \sigma_i) \bar{\Phi}(k_i)]$$
$$= \sigma_i \phi(k_i) / \mu_i + \bar{\Phi}(k_i),$$

where the last equality takes into account the relation $G(k_i) = \phi(k_i) - k_i \bar{\Phi}(k_i)$ (see property (a) in §3.2).

3.4 Lead Times

To characterize $\tilde{L}_i$, the actual lead time at store i, reason as follows: When store i issues an order, the order goes to all of its supply stores; if these stores all have on-hand inventory, then the actual lead time is just store i's own nominal lead time, i.e., $\tilde{L}_i = L_i$. This happens with probability $$\pi_i(\emptyset) := \prod_{j \in S_{>i}} f_j, \quad (16)$$

where $f_j$ is the fill rate, the portion of orders supplied by on-hand inventory at store j. In other words, π represents the portion of orders at store i that experiences the store's nominal lead time. On the other hand, if the order is not filled immediately at a subset of the supply stores, say, $A \subseteq S_{>i}$, due to stockout, then there is an additional delay. Hence, $$\tilde{L}_i = L_i + \max_{j \in A} \{\tau_j\}, \quad (17)$$

where $\tau_j$ denotes the additional delay at store $j \in A$—a quantity that is quite intractable in general, and will be approximated later. And this happens with probability $$\pi_i(A) := \prod_{j \in A} \bar{f}_j \prod_{j \in S_{>i} \setminus A} f_j. \quad (18)$$

In other words, $\pi_i(A)$ is the portion of orders that experiences a lead time $\tilde{L}_i$ in (17) at store i.

Note that there are several assumptions involved in (16) and (18); and to the extent that they deviate from the reality of the system, they should be viewed as approximations. First, the product-form assumes independence among the set of stores ($S_{>i}$) that supplies i, whereas, insofar as these stores always receive the same order simultaneously from store i, they are not really independent. Second, without the iid setting (of a renewal process, for instance), it is hard to justify that each order will necessarily experience a lead time that follows the same distribution.

Even with these assumptions, the above lead-time model still suffers from the shortcoming of combinatorial explosion: $\tilde{L}_i$ is a mixture of $2^{|S_{>i}|}$ cases (of orders not filled on arrival). Hence, we further use the following approximation: ignore those cases in which an order is not filled simultaneously at two or more stores, and renormalize the probabilities accordingly. This way, we have $$\tilde{L}_i = \begin{cases} L_i & \text{w.p. } \pi_{0i} \\ L_i + \tau_j & \text{w.p. } \pi_{ji}, j \in S_{>i}, \end{cases} \quad (19)$$

where $$\pi_{0i} := \left(1 + \sum_{h \in S_{>i}} \bar{f}_h / f_h\right)^{-1}, \quad (20)$$

$$\pi_{ji} := (\bar{f}_j / f_j) \left(1 + \sum_{h \in S_{>i}} \bar{f}_h / f_h\right)^{-1}.$$

Note that in the above model, we assume that $f_h > 0$ for all $h \in S_{>i}$. In case $f_j = 0$ for some $j \in S_{>i}$, we let $\tilde{L}_i = L_i + \tau_j$ with probability 1; in case there are two stores, j, j'$\in S_{>i}$ with $f_j = 0$ and $f_{j'} = 0$, we associate equal probability (½) with $\tilde{L}_i = L_i + \tau_j$ and $\tilde{L}_i = L_i + \tau_{j'}$; and so forth.

As we mentioned above, the quantity $\tau_j$ is difficult to characterize. For instance, consider the first order (assume unit batch size) that arrives to the backorder queue at store j. Upon its arrival at store j, there is zero on-hand inventory, and $R_j$ orders are in processing. Hence, $\tau_j$ equals the minimum of the $R_j$ (residual) processing times; and the output rate at store j is $R_j/E(\tilde{L}_j)$ (roughly, treating residuals as whole processing times). However, this will change once another order arrives.

Consider, therefore, the simpler model, M/M/∞. Without loss of generality, assume the arrival rate is unity. Let S denote the generic service time, and denote $\rho = E(S)$. We know that the mean number of busy servers (which is equal to the mean number of jobs in the system) is $E(N) = \rho$. (In fact, N follows a Poisson distribution; and this holds even when the service time S follows a general distribution. However, the analysis below does require S to follow an exponential distribution.) Let $\Delta_l$ be the time until the next service completion, starting with 1 servers busy. Then, conditioning on the next event being either an arrival or a service completion, we have $$E(\Delta_l) = \frac{1}{1+l/p} \cdot \frac{l/p}{1+l/p} + \left[\frac{1}{1+l/p} + E(\Delta_{l+1})\right] \cdot \frac{1}{1+l/p}$$

$$= \frac{1}{1+l/p} + E(\Delta_{l+1}) \cdot \frac{1}{1+l/p}$$

$$= \frac{\rho}{\rho+l} + E(\Delta_{l+1}) \cdot \frac{\rho}{\rho+l}.$$

Hence, recursively, we have $$E(\Delta_l) = \frac{\rho}{\rho+l} + \frac{\rho^2}{(\rho+l)(\rho+l+1)} + \frac{\rho^3}{(\rho+l)(\rho+l+1)(\rho+l+2)} + \cdots.$$

Now, given l (>R) servers busy, the expected time until there are l−R service completions is equal to the following:

$$\sum_{m=R+1}^{l} E(\Delta_m) = \sum_{m=R+1}^{l} \left[\frac{\rho}{\rho+m} + \frac{\rho^2}{(\rho+m)(\rho+m+1)} + \frac{\rho^3}{(\rho+m)(\rho+m+1)(\rho+m+2)} + \cdots\right]$$

$$\leq \sum_{m=R+1}^{l} \left[\frac{\rho}{\rho+m} + \frac{\rho^2}{(\rho+m)^2} + \frac{\rho^3}{(\rho+m)^3} + \cdots\right]$$

$$= \sum_{m=R+1}^{l} \frac{\rho}{m} \leq \rho \cdot \frac{l-R}{R+1}.$$

Therefore, we use the last upper bound above as a basis to approximate $\tau_j$. In our context, $\rho=E(\tilde{L}_j)$, and we further replace l by $E[N_j|N_j>R_j]$, and hence replace l−R by $E[N_j-R_j|N>R_j]=E(B_j)/p_j$. This way, we arrive at the following approximation:

$$\tau_j = \tilde{L}_j r_j, \text{ where } r_j := \frac{E(B_j)}{p_j(R_j+1)}. \quad (21)$$

3.5 Demand over Lead Times

We now return to the characterization of $\mu_i$ and $\sigma_i$, when demands are non-stationary. Denote $$D_i^{cum}(l):=D_i(1)+\ldots+D_i(l)$$

(Note that the $D_i$'s on the right hand sides above are demand data after the offset described in §2.)

From (1) it is clear that $\mu_i$ is simply the mean of the cumulative demand over the lead time: $\mu_i=E[D_i^{cum}(\tilde{L}_i)]$. Conditioning on $\tilde{L}_i$, we have $$\mu_i = \pi_{0i}E[D_i^{cum}(L_i)] + \sum_{j \in S_{>i}} \pi_{ji}E[D_i^{cum}(L_i+\tau_j)] \quad (22)$$

As to $\sigma_i^2$, the situation is more involved. From (2), assuming (rather reasonably) that $E(X) \geq 1$, and recognizing $$\int_0^\infty \bar{F}_i^2(y)dy \leq \int_0^\infty \bar{F}_i(y)dy = E(\tilde{L}_i),$$

we have $$\sigma_i^2 \leq E(N_i)+\lambda_i[E(X_i^2)-E(X_i)]\int_0^\infty \bar{F}_i(y)dy = \text{Var }(D_i)E(\tilde{L}_i),$$

since $\lambda_i E(X_i^2)=\text{Var}(D_i)$, and $E(N_i)=\lambda_i E(X_i)E(\tilde{L}_i)$. Similarly, we have the following lower bound:

$$\sigma_i^2 \geq \text{Var }(D_i)\int_0^\infty \bar{F}_i^2(y)dy.$$

Since the difference between $\int_0^\infty \bar{F}_i^2(y)dy$ and $\int_0^\infty \bar{F}_i(y)dy=E(\tilde{L}_i)$ is likely quite small, we will use the above upper bound of $\sigma_i^2$ as an approximation, which leads to the following:

$$\sigma_i^2 = E\{\text{Var}[D_i^{cum}(\tilde{L}_i) | \tilde{L}_i]\} \quad (23)$$

$$= E\left\{\sum_{k=1}^{L_i} \text{Var}[D_i(k)]\right\}$$

$$= \pi_{0i}E\{\text{Var}[D_i^{cum}(L_i) | L_i]\} + \sum_{j \in S_{>i}} \pi_{ji}E\{\text{Var}[D_i^{cum}(L_i+\tau_j) | L_i+\tau_j]\}.$$

Note that the above could be compared against the following general relationship:

$$\text{Var }[D_i^{cum}(\tilde{L}_i)]=E\{\text{Var }[D_i^{cum}(\tilde{L}_i)|\tilde{L}_i]\}+\text{Var }\{E[D_i^{cum}(\tilde{L}_i)|\tilde{L}_i]\}.$$

In other words, $\sigma_i^2$, the variance of the number of jobs in the $M^X/G/\infty$ queue, is close to (i.e, can be approximated by, as we discussed above) the first term of $\text{Var}[D_i^{cum}(\tilde{L}_i)]$. Also note that the two expectations in (23) can be derived as follows:

$$E\{\text{Var}[D_i^{cum}(L_i) | L_i]\} = E\left\{\sum_{m=1}^{L} \text{Var}[D_i(m)]\right\} \quad (24)$$

$$= \sum_l \text{Var}[D_i^{cum}(l)]P[L = l],$$

$$E\{\text{Var}[D_i^{cum}(L_i+\tau_j) | L_i+\tau_j]\} = E\left\{\sum_{m=1}^{L_i+\tau_j} \text{Var}[D_i(m)]\right\} \quad (25)$$

$$= \sum_l \text{Var}[D_i^{cum}(l)]P[L_i+\tau_j = l].$$

3.6 Customer Serviceability

For end stores—stores that directly supply external customer demand, the starting point is the fill rate, which is determined by the required customer service level; and the fill rate, in turn, determines the safety factor and the base-stock level. This is in contrast to the case of internal stores discussed above, where the base-stock level is first set, which then determines the stockout probability and the fill rate.

Consider a particular customer class, and suppose its demand is supplied by one of the end stores, $i \in S_o$. Let $W_i$ denote the waiting time to receive an order. Recall the required service level is $$P[W_i \leq \beta_i] \geq \alpha_i, \quad (26)$$

where $\beta_i$, and $\alpha_i$ are given data. When the demand is supplied from on-hand inventory, the delay is simply the transportation time $T_i$—time to deliver the finished products to customers; otherwise, there is an additional delay of $\tau_i$. (See the discussion in §3.4; in particular, $\tau_i$ follows the approximation in (21).) Hence, $$P[W_i \leq \beta_i]=f_iP[T_i \leq \beta_i]+(1-f_i)P[T_i+\tau_i \leq \beta_i]. \quad (27)$$

In order for the above to be at least $\alpha_i$, we need to set $f_i$ at least at the following level:

$$f_i = \frac{\alpha_i - P[T_i + \tau_i \le \beta_i]}{P[T_i \le \beta_i] - P[T_i + \tau_i \le \beta_i]}. \tag{28}$$

There are two exceptions to the above analysis:

(i) $\alpha_i > P[T_i \le \beta_i]$: In this case, the required serviceability is too high—even a 100% fill rate will not be able to meet the desired service level. So the problem is infeasible.

(ii) $\beta_i$ is large enough so that $P[T_i \le \beta_i] = P[T_i + \tau_i \le \beta_i] = 1$: any fill rate will meet the service requirement. In this case, the constraint becomes superfluous. As a regulation, we will remove i from the set $S_o$. (In other words, $S_o$ only includes those end stores that have non-trivial serviceability constraints.)

The quantity $\tau_i$ involved in the right hand side of (28) can be expressed as $\tau_i = \tilde{L}_i \tau_i$, following (21). Since $\tau_i$ involves $B_i$ and $R_i$, both of which are functions of $k_i$, and so is $f_i$ (refer to (15)). Hence, in principle one needs to solve a fixed point problem defined by the equation in (21) to get $f_i$ (or $k_i$). However, in the optimization routine (to be elaborated later), we can avoid solving this fixed point problem by simply using the $\tau_i$ value of the previous iteration. Once $f_i$ and $k_i$ are derived, the base-stock level and the stockout probability $p_i$ then follow (5) and (11).

4 The Optimization Model

The objective of our optimization model is to minimize the total expected inventory capital (note: not inventory hold cost) throughout the network, while satisfying customer service level requirements, as specified in (28).

There are two types of inventory at each store in the system: on-hand inventory (or, finished goods), and work-in-process (WIP; or, pipeline) inventory. (Note, the WIP includes the orders in transition (i.e., being transported) from one store to another.) From the analysis in §3.1, we know the expected on-hand inventory at store i is $E[I_i] = \sigma_i H(k_i)$, and the expected WIP is $E[N_i] = \mu_i$.

Recall $c_i$ is the inventory capital per s.k.u. at store i. This applies to the finished-goods, or on-hand, part of the inventory. For the part that is in the pipeline at store i, we apply another cost coefficient:

$$\hat{c}_i := \sum_{j \in S_{>i}} c_j u_{ji},$$

which is the cost for the raw materials from the stores that supply i. (Recall $u_{ji}$ is the usage count—number of units from store j that is needed for each unit in store i.)

Therefore, the objective function takes the following form:

$$C(k) = \sum_{i \in S} [\hat{c}_i \mu_i + c_i \sigma_i H(k_i)]. \tag{29}$$

(Note that the summation above is over all stores, including end stores.) And we want to minimize $C(k)$, subject to the constraints in (28)—for the end stores: $i \in S_o$.

Note here we choose as decision variables the safety factors, $k_i$ for store i. In view of (11), we could also choose $p_i$ instead. Also note that here we allow zero or even negative base-stock levels. These correspond to policies that choose to keep back-orders instead of inventory. (This is indeed the case in a make-to-order system, for instance.) The objective function in (29), however, is always nonnegative: note in particular that $H(k_i)$ is nonnegative, cf. (8).

Next, let us have a closer look at the constrained minimization problem formulated in §??. Splitting the summation in (29) into two parts: end stores and non-end stores, we have $$C(k) = \left( \sum_{i \notin S_0} + \sum_{i \in S_0} \right) [\hat{c}_i \mu_i + c_i \sigma_i H(k_i)]. \tag{30}$$

Two observations are in order. Note that the first summation does not depend on $(k_i)_{i \in S_o}$: the (actual) lead times at any store depend only on its supply store, the lead times at the non-end stores are independent of the safety factors of the end stores. On the other hand, in each term of the second summation, $H(k_i)$ is the only quantity that depends on $k_i$, $i \in S_o$, the mean and the standard deviation depend (through the lead time) on the non-end stores, specifically, on $(k_i)_{i \in S}$.

Now, consider an end store, $i \in S_o$. From (28), it is clear that the safety factor of the store, $k_i$, is increasing in its fill rate $f_i$, taking into account that $G(k_i)$ is decreasing in $k_i$, and $\mu_i$ and $\sigma_i$ are independent of $k_i$. Since $H(k_i)$ is increasing in $k_i$, it is hence increasing in $f_i$. Therefore, to minimize the objective function in (30), the constraints for the end stores should all be binding, i.e., the $f_i$ values should be set at the lowest possible value. In other words, we can remove the constraints in (28) by removing $(k_i)_{i \in S_o}$ from the set of decision variables, treating them instead as dependent—through equations in (28)—on the decision variables, $k = (k_i)_{i \notin S_o}$. This way, we have an unconstrained problem of minimizing $C(k)$. Clearly, this treatment is equivalent to the (more standard) Lagrangian multiplier approach, which incorporates the constraints into the objective function as a penalty term.

Finally, another observation: Although as mentioned earlier, we allow negative base-stock levels, these will not likely be candidates for the optimal solution that minimizes the objective function in (29). This is because a negative $R_i < 0$ implies $k_i > -\mu_i/\sigma_i$. When $\mu_i/\sigma_i$ is moderately large, $H(k_i) \approx 0$. Hence, by increasing $k_i$ (i.e., making it less negative), we can reduce $\tilde{L}_{i'}$ for any store i' that is supplied by i, and hence reduce $\mu_{i'}$. This way, we will have reduced the $\mu_i$ part of (29) while keeping the $\sigma_i$ part at zero. Based on this observation, below we will ignore the possibility of negative base-stock levels, or, $k_i < -\mu_i/\sigma_i$.

5 Gradients

The gradients of the objective function play a very important role in the optimization. For any given store j, $j \notin S_o$ (i.e., non-end store, as explained above), we now derive the partial derivative $\partial/\partial k_j C(k)$.

First, consider the j-th term in $C(k)$ of (29). Note that the actual lead time at store j, $\tilde{L}_j$, is independent of $k_j$: it only depends on the fill rates, and hence the safety factors, of its supply stores; refer to (19). So both $\mu_j(\tilde{L}_j)$ and $\sigma_j(\tilde{L}_j)$ are independent of $k_j$. Hence, the partial derivative (w.r.t. $k_j$) of the j-th term is:

$$c_j \sigma_j H'(k_j) = c_j \sigma_j \Phi(k_j).$$

Second, consider $i \in S_{j>}$ (or, equivalently, $j \in S_{>i}$), i.e., a store that receives supplies directly from j. Suppose i is not an end store, i.e., $i \notin S_o$. Then, $\tilde{L}_i$ depends on $\bar{f}_j$ [cf. (19)], and hence also on $k_j$; whereas $k_i$ is independent of $k_j$. Hence, the partial derivative (w.r.t. $k_j$) of this i-th term is $$\hat{c}_i \frac{\partial \mu_i}{\partial k_j} + c_i H(k_i) \frac{\partial \sigma_i}{\partial k_j}.$$

When i is an end store, $i \in S_o$, $k_i$ also depends on $k_j$, since it is determined by the fill rate, which, in turn, depends on $\tilde{L}_i$ and hence on $k_j$. In this case, the partial derivative is $$\hat{c}_i \frac{\partial \mu_i}{\partial k_j} + c_i \left[ H(k_i) \frac{\partial \sigma_i}{\partial k_j} + \sigma_i \Phi(k_i) \frac{\partial k_i}{\partial k_j} \right].$$

We ignore the contribution (to the derivative $\partial/\partial k_j C(k)$) from all other stores that are indirectly supplied by j. Hence, we have, $$\frac{\partial}{\partial k_j} C(k) = c_j \sigma_j \Phi(k_j) + \sum_{i \in S_{j>} \setminus S_0} \left[ \hat{c}_i \frac{\partial \mu_i}{\partial k_j} + c_i H(k_i) \frac{\partial \sigma_i}{\partial k_j} \right] +$$

$$\sum_{i \in S_{j>} \cap S_0} \left\{ \hat{c}_i \frac{\partial \mu_i}{\partial k_j} + c_i \left[ H(k_i) \frac{\partial \sigma_i}{\partial k_j} + \sigma_i \Phi(k_i) \frac{\partial k_i}{\partial k_j} \right] \right\}$$

$$= c_j \sigma_j \Phi(k_j) + \sum_{i \in S_{j>}} \left[ \hat{c}_i \frac{\partial \mu_i}{\partial k_j} + c_i H(k_i) \frac{\partial \sigma_i}{\partial k_j} \right] + \sum_{i \in S_{j>} \cap S_0} c_i \sigma_i \Phi(k_i) \frac{\partial k_i}{\partial k_j}$$

Since, from (15), we have $$\frac{\partial \bar{f}_j}{\partial k_j} = -\frac{\sigma_j}{\mu_j} k_j \phi(k_j) - \phi(k_j) = -\frac{R_j}{\mu_j} \phi(k_j),$$

we can rewrite $$\frac{\partial}{\partial k_j} C(k)$$

as follows:

$$\frac{\partial}{\partial k_j} C(k) = c_j \sigma_j \Phi(k_j) - \frac{R_j}{\mu_j} \phi(k_j) \cdot \quad (31)$$

$$\left\{ \sum_{i \in S_{j>}} \left[ \hat{c}_i \frac{\partial \mu_i}{\partial \bar{f}_j} + c_i H(k_i) \frac{\partial \sigma_i}{\partial \bar{f}_j} \right] + \sum_{i \in S_{j>} \cap S_0} c_i \sigma_i \Phi(k_i) \frac{\partial k_i}{\partial \bar{f}_j} \right\}.$$

So what remains is to derive $\partial \mu_i / \partial \bar{f}_j$ and $\partial \sigma_i / \partial \bar{f}_j$ for $i \in S_{j>}$, and $\partial k_i / \partial \bar{f}_j$ for $i \in S_{j>} \cap S_o$.

5.1 Derivation of $$\frac{\partial \mu_i}{\partial \bar{f}_j} \text{ and } \frac{\partial \sigma_i}{\partial \bar{f}_j},$$

for $i \in S_{j>}$

From (22), we have $$\frac{\partial \mu_i}{\partial \bar{f}_j} = E[D_i^{cum}(L_i)] \frac{\partial \pi_{0i}}{\partial \bar{f}_j} + \sum_{h \in S_{>i}} E[D_i^{cum}(L_i + \tau_h)] \frac{\partial \pi_{hi}}{\partial \bar{f}_j} + \quad (32)$$

$$\pi_{ji} \frac{\partial}{\partial \bar{f}_j} E[D_i^{cum}(L_i + \tau_j)].$$

Similarly, from (23), we have $$\frac{\partial \sigma_i}{\partial \bar{f}_j} = E\{\text{Var}[D_i^{cum}(L_i) | L_i]\} \frac{\partial \pi_{0i}}{\partial \bar{f}_j} + \quad (33)$$

$$\sum_{h \in S_{>i}} E\{\text{Var}[D_i^{cum}(L_i + \tau_h) | L_i + \tau_h]\} \frac{\partial \pi_{hi}}{\partial \bar{f}_j} +$$

$$\pi_{ji} \frac{\partial}{\partial \bar{f}_j} E\{\text{Var}[D_i^{cum}(L_i + \tau_j) | L_i + \tau_j]\}.$$

Now, it is easy to derive from (20) the following:

$$\frac{\partial \pi_{0i}}{\partial \bar{f}_j} = -\frac{\pi_{0i}^2}{f_j^2}, \quad \frac{\partial \pi_{hi}}{\partial \bar{f}_j} = -\frac{\pi_{0i} \pi_{hi}}{f_j^2} \quad h \neq j, \quad (34)$$

and $$\frac{\partial \pi_{ji}}{\partial \bar{f}_j} = \frac{\pi_{0i} - \pi_{0i} \pi_{ji}}{f_j^2}. \quad (35)$$

Hence, the first two terms on the right hand side of (32) and (33) are, respectively, as follows:

$$E[D_i^{cum}(L_i)] \frac{\partial \pi_{0i}}{\partial \bar{f}_j} + \sum_{h \in S_{>i}} E[D_i^{cum}(L_i + \tau_h)] \frac{\partial \pi_{hi}}{\partial \bar{f}_j} = \quad (36)$$

$$\pi_{0i} \text{over} f_j^2 \{ E[D_i^{cum}(L_i + \tau_j)] - E[D_i^{cum}(\tilde{L}_i)] \},$$

and $$E\{\text{Var}[D_i^{cum}(L_i) | L_i]\} \frac{\partial \pi_{0i}}{\partial \bar{f}_j} + \quad (37)$$

$$\sum_{h \in S_{>i}} E\{\text{Var}[D_i^{cum}(L_i + \tau_h) | L_i + \tau_j]\} \frac{\partial \pi_{hi}}{\partial \bar{f}_j} =$$

$$\frac{\pi_{0i}}{f_j^2} \{ E[\text{Var}[D_i^{cum}(L_i + \tau_j) | L_i + \tau_j]] - E[\text{Var}[D_i^{cum}(\tilde{L}_i) | \tilde{L}_i]] \}.$$

The conditional variance terms above follow the expressions in (24) and (25).

Next, consider the third term on the right hand side of (32) and (33). We have $$\frac{\partial}{\partial \bar{f}_j} E[D_i^{cum}(L_i + \tau_j)] = \quad (38)$$

$$\frac{\partial}{\partial \bar{f}_j} \int_{-\infty}^{+\infty} E[D_i^{cum}(L_i + x)] \phi\left(\frac{x - E(\tau_j)}{\text{sd}(\tau_j)}\right) \frac{dx}{\text{sd}(\tau_j)}.$$

Writing $$z := \frac{x - E(\tau_j)}{\text{sd}(\tau_j)},$$

and recognizing $\phi'(z)=-z\phi(z)$, we have $$\frac{\partial}{\partial \bar{f}_j} \phi(z)\,\text{sd}(\tau_j) = -\frac{\phi(z)}{\text{Var}(\tau_j)}\frac{\partial}{\partial \bar{f}_j}\text{sd}(\tau_j) - \frac{z\phi(z)}{\text{sd}(\tau_j)}\frac{\partial z}{\partial \bar{f}_j}$$

$$= -\frac{\phi(z)}{\text{Var}(\tau_j)}\frac{\partial}{\partial \bar{f}_j}\text{sd}(\tau_j) + \frac{z\phi(z)}{\text{Var}(\tau_j)}\frac{\partial}{\partial \bar{f}_j}E(\tau_j) + \frac{z^2\phi(z)}{\text{Var}(\tau_j)}\frac{\partial}{\partial \bar{f}_j}\text{sd}(\tau_j)$$

$$= \frac{\phi(z)}{\text{Var}(\tau_j)}\left[z\frac{\partial}{\partial \bar{f}_j}E(\tau_j) + (z^2-1)\frac{\partial}{\partial \bar{f}_j}\text{sd}(\tau_j)\right].$$

Therefore, substituting the above into (38), and writing $$Z(\tau_j):=E(\tau_j)+Z\cdot\text{sd}(\tau_j),$$

with Z (on the right hand side) denoting the standard normal variate, we have $$\frac{\partial}{\partial \bar{f}_j}E[D_i^{cum}(L_i+\tau_j)] = \quad (39)$$

$$[\text{sd}(\tau_j)]^{-1}\left\{E[ZD_i^{cum}(L_i+Z(\tau_j))]\frac{\partial}{\partial \bar{f}_j}E(\tau_j) + \right.$$

$$\left.(E[Z^2 D_i^{cum}(L_i+Z(\tau_j))] - E[D_i^{cum}(L_i+\tau_j)])\frac{\partial}{\partial \bar{f}_j}\text{sd}(\tau_j)\right\}.$$

Similarly, $$\frac{\partial}{\partial \bar{f}_j}E[\text{Var}[D_i^{cum}(L_i+\tau_j)\mid L_i+\tau_j]] = \quad (40)$$

$$[\text{sd}(\tau_j)]^{-1}\left\{E[Z\cdot\text{Var}[D_i^{cum}(L_i+Z(\tau_j))\mid L_i+Z(\tau_j)]]\frac{\partial}{\partial \bar{f}_j}E(\tau_j) + \right.$$

$$(E[Z^2\cdot\text{Var}[D_i^{cum}(L_i+Z(\tau_j))\mid L_i+Z(\tau_j)]] -$$

$$\left.E[\text{Var}[D_i^{cum}(L_i+\tau_j))\mid L_i+\tau_j]])\frac{\partial}{\partial \bar{f}_j}\text{sd}(\tau_j)\right\}.$$

From (21), making use of $G(k_j)=\phi(k_j)-k_j\bar{\Phi}(k_j)$, and writing $g(k_j):=\phi(k_j)/\bar{\Phi}(k_j)$, we have $$r_j := \frac{\sigma_j G(k_j)}{\bar{\Phi}(k_j)(R_j+1)} = \frac{\sigma_j[g(k_j)-k]}{\mu_j+\sigma_j k_j+1}. \quad (41)$$

Then, $$E(\tau_j)=\tau_j E(\tilde{L}_j), \text{sd}(\tau_j)=\tau_j \text{sd}(\tilde{L}_j),$$

and hence $$\frac{\partial}{\partial \bar{f}_j}E(\tau_j) = -\frac{\mu_j E(\tilde{L}_j)}{R_j\phi(k_j)}\frac{\partial r_j}{\partial k_j}, \quad \frac{\partial}{\partial \bar{f}_j}\text{sd}(\tau_j) = -\frac{\mu_j \text{sd}(\tilde{L}_j)}{R_j\phi(k_j)}\frac{\partial r_j}{\partial k_j}. \quad (42)$$

Since $g'(k_j)=g^2(k_j)-k_j g(k_j)$, we have, from (41), $$\frac{\partial r_j}{\partial k_j} = \frac{\sigma_j[g^2(k_j)-k_j g(k_j)-1]}{R_j+1} - \frac{\sigma_j^2[g(k_j)-k_j]}{(R_j+1)^2}. \quad (43)$$

5.2 Derivation of $\partial k_i/\partial \bar{f}_j$, for $i \in S_{j>} \cap S_O$ We have $$\frac{\partial k_i}{\partial \bar{f}_j} = \frac{\partial k_i}{\partial \bar{f}_i}\frac{\partial \bar{f}_i}{\partial \bar{f}_j} = \frac{-\mu_i}{R_i\phi(k_i)}\frac{\partial \bar{f}_i}{\partial \bar{f}_j}.$$

Next, from (28), we have $$\frac{\partial \bar{f}_i}{\partial \bar{f}_j} = \frac{\bar{f}_i}{P[T_i\le\beta_i]-P[T_i+\tau_i\le\beta_i]}\cdot\frac{\partial}{\partial \bar{f}_j}P[T_i+\tau_i\le\beta_i].$$

Similar to the derivation of (39) and (40), writing $$Y_i:=[\beta_i-T_i-E(\tau_i)]/\text{sd}(\tau_i),$$

and $$P[T_i+\tau_i\le\beta_i]=E[\Phi(Y_i)],$$

we have $$\frac{\partial}{\partial \bar{f}_j}P[T_i+\tau_i\le\beta_i] = \quad (44)$$

$$-[\text{sd}(\tau_i)]^{-1}\left\{E[\phi(Y_i)]\frac{\partial}{\partial \bar{f}_j}E(\tau_i) + E[Y_i\phi(Y_i)]\frac{\partial}{\partial \bar{f}_j}\text{sd}(\tau_i)\right\}.$$

Therefore, combining the above, we have $$\frac{\partial k_i}{\partial \bar{f}_j} = \frac{\mu_i \bar{f}_i\left\{E[\phi(Y_i)]\frac{\partial}{\partial \bar{f}_j}E(\tau_i) + E[Y_i\phi(Y_i)]\frac{\partial}{\partial \bar{f}_j}\text{sd}(\tau_i)\right\}}{R_i\phi_i(k_i)\text{sd}(\tau_i)\{P[T_i\le\beta_i]-P[T_i+\tau_i\le\beta_i]\}}. \quad (45)$$

To derive $\partial/\partial \bar{f}_j E(\tau_i)$ and $\partial/\partial \bar{f}_j\text{sd}(\tau_i)$, note $\tau_i=\tilde{L}_i\tau_i$, and following the discussion at the end of §3.6, we treat $\tau_i$ as a constant (from the last iteration of the optimization routine) independent of $\bar{f}_j$. Hence, similar to the derivation of (36), we have $$\frac{\partial}{\partial \bar{f}_j}E(\tau_i) = \quad (46)$$

$$r_i\frac{\partial}{\partial \bar{f}_j}E(\tilde{L}_i) = r_i(\pi_{0i}/f_j^2)[E(L_i+\tau_i)-E(\tilde{L}_i)] + r_i\pi_{ji}\frac{\partial}{\partial \bar{f}_j}E(\tau_j).$$

Similarly, $$\frac{\partial}{\partial \bar{f}_j}E(\tau_i^2) = r_i^2\frac{\partial}{\partial \bar{f}_j}E(\tilde{L}_i^2) = r_i^2(\pi_{0i}/f_j^2)[E((L_i+\tau_i)^2)-E(\tilde{L}_i^2)] +$$

$$r_i^2\pi_{ji}\left[2E(L_i)\frac{\partial}{\partial \bar{f}_j}E(\tau_j) + \frac{\partial}{\partial \bar{f}_j}E(\tau_j^2)\right].$$

Hence, $$\frac{\partial}{\partial \bar{f}_j}\text{sd}(\tau_i) = \frac{1}{2}[\text{sd}(\tau_i)]^{-1/2}\frac{\partial}{\partial \bar{f}_j}E(\tau_i^2) - 2E(\tau_i)\frac{\partial}{\partial \bar{f}_j}E(\tau_i). \quad (47)$$

The derivatives $\partial/\partial \bar{f}_j E(\tau_j)$ and $\partial/\partial \bar{f}_j E(\tau_j^2)$ in the above expressions follow from (42), with $$\frac{\partial}{\partial \overline{f}_j} E(\tau_j^2) =$$

$$\frac{\partial}{\partial \overline{f}_j}[\text{sd}^2(\tau_j) + E^2(\tau_j)] = 2\text{sd}(\tau_j)\frac{\partial}{\partial \overline{f}_j}\text{sd}(\tau_j) + 2E(\tau_j)\frac{\partial}{\partial \overline{f}_j} E(\tau_j).$$

6 Shadow Prices

Now, consider the sensitivity of the objective value, at optimality, w.r.t. the service level $\alpha_i$ [cf. (26)], for any given end store $i \in S_o$. Taking partial derivative, $\partial C/\partial \alpha_i$, from (30), we know that the only term that contributes to this derivative is the i-th term in the second summation: the other terms there do not depend on $\alpha_i$, whereas the contribution from any term j in the first summation is:

$$\frac{\partial C}{\partial k_j}\frac{\partial k_j}{\partial \alpha_i} = 0,$$

since $$\frac{\partial C}{\partial k_j} = 0$$

follows from the first-order (necessary) condition at optimality. Hence, $$\frac{\partial C}{\partial \alpha_i} = \frac{\partial}{\partial k_i}[\hat{c}\mu_i + c_i\sigma_i H(k_i)] \cdot \frac{\partial k_i}{\partial \overline{f}_i}\frac{\partial \overline{f}_i}{\partial \alpha_i} = -\frac{c_i\mu_i\sigma_i\Phi(k_i)}{R_i\phi(k_i)}\frac{\partial \overline{f}_i}{\partial \alpha_i}. \quad (48)$$

Taking partial derivatives on both sides of (28) w.r.t. $\alpha_i$, we have $$\frac{\partial \overline{f}_i}{\partial \alpha_i} = \frac{-1 + \overline{f}_i\frac{\partial}{\partial \alpha_i}P[T_i + \tau_i \leq \beta_i]\frac{\partial \overline{f}_i}{\partial \alpha_i}}{P[T_i \leq \beta_i] - P[T_i + \tau_i \leq \beta_i]}. \quad (49)$$

Hence, $$\frac{\partial \overline{f}_i}{\partial \alpha_i} = \left\{P[T_i \leq \beta_i] - P[T_i + \tau_i \leq \beta_i] - \overline{f}_i\frac{\partial}{\partial \overline{f}_i}P[T_i + \tau_i \leq \beta_i]\right\}^{-1}.$$

Substituting the above into (48), we have $$\frac{\partial C}{\partial \alpha_i} = \frac{c_i\mu_i\sigma_i\Phi(k_i)}{R_i\phi(k_i)\left\{P[T_i \leq \beta_i] - P[T_i + \tau_i \leq \beta_i] - \overline{f}_i\frac{\partial}{\partial \overline{f}_i}P[T_i + \tau_i \leq \beta_i]\right\}}. \quad (50)$$

Now, suppose we solve our constrained optimization problem using the standard Lagrangian multiplier approach. Add to the objective function (30) the following penalty part:

$$\sum_{i \in S_0} \lambda_i(\alpha_i - P[W_i \leq \beta]),$$

where $\lambda_i \geq 0$, $i \in S_o$, are the Lagrangian multipliers. Taking partial derivative on the Lagrangian (i.e., (30) plus the above penalty term) w.r.t. $k_i$, for some $i \in S_o$, and equating the derivative to zero, we have $$c_i\sigma_i\Phi(k_i) = \lambda_i\frac{\partial}{\partial k_i}P[W_i \leq \beta_i].$$

Furthermore, from (27), we have $$\frac{\partial}{\partial k_i}P[W_i \leq \beta_i] = -\frac{\partial \overline{f}_i}{\partial k_i}\left\{P[T_i \leq \beta_i] - P[T_i + \tau_i \leq \beta_i]\right\} +$$

$$\overline{f}_i\frac{\partial}{\partial \overline{f}_i}P[T_i + \tau_i \leq \beta_i]\right\} \cdot \frac{\partial \overline{f}_i}{\partial k_i}$$

$$= \frac{R_i}{\mu_i}\phi(k_i)\left\{P[T_i \leq \beta_i] - P[T_i + \tau_i \leq \beta_i] - \overline{f}_i\frac{\partial}{\partial \overline{f}_i}P[T_i + \tau_i \leq \beta_i]\right\}.$$

Hence, $$\lambda_i = \frac{c_i\mu_i\sigma_i\Phi(k_i)}{R_i\phi(k_i)\left\{P[T_i \leq \beta_i] - P[T_i + \tau_i \leq \beta_i] - \overline{f}_i\frac{\partial}{\partial \overline{f}_i}P[T_i + \tau_i \leq \beta_i]\right\}}.$$

Comparing the above with (50), we observe, as expected, $\lambda_i = \partial C/\partial \alpha_i$, i.e., at optimality, the sensitivity of the objective value w.r.t. the constraint is equal to the Lagrangian multiplier—the "shadow price" of the constraint.

Note that (50) is not an explicit expression, since we have yet to derive the derivative $\partial/\partial \overline{f}_i P[T_i + \tau_i \leq \beta_i]$. Rewrite (49) as follows:

$$\frac{\partial \overline{f}_i}{\partial \alpha_i} = \frac{-1 + \overline{f}_i\frac{\partial}{\partial \alpha_i}P[T_i + \tau_i \leq \beta_i]}{P[T_i \leq \beta_i] - P[T_i + \tau_i \leq \beta_i]}. \quad (51)$$

Similar to the derivation of (44), writing $Y_i := [\beta_i - T_i - E(\tau_i)]/\text{sd}(\tau_i)$, we can derive $$\frac{\partial}{\partial \alpha_i}P[T_i + \tau_i \leq \beta_i] = \quad (52)$$

$$\frac{-1}{\text{sd}(\tau_i)}\left\{E[\phi(Y_i)]\frac{\partial}{\partial \alpha_i}E(\tau_i) + E[Y_i\phi(Y_i)]\frac{\partial}{\partial \alpha_i}\text{sd}(\tau_i)\right\}$$

-continued $$= \frac{-1}{\text{sd}(\tau_i)}\frac{\partial \overline{f}_i}{\partial \alpha_i}\left\{E[\phi(Y_i)]\frac{\partial}{\partial \overline{f}_i}E(\tau_i) + E[Y_i\phi(Y_i)]\frac{\partial}{\partial \overline{f}_i}\text{sd}(\tau_i)\right\}.$$

Substituting the above into the right hand side of (51) and solving for $\partial \overline{f}_i/\partial \alpha_i$, we have, $$\frac{\partial \bar{f}_i}{\partial \alpha_i} = \left\{ P[T_i \le \beta_i] - P[T_i + \tau_i \le \beta_i] + \frac{\bar{f}_i E\phi(Y_i)}{\text{sd}(\tau_i)} \frac{\partial}{\partial \bar{f}_i} E(\tau_i) + E[Y_i \phi(Y_i)] \frac{\partial}{\partial \bar{f}_i} \text{sd}(\tau_i) \right\}^{-1}.$$

Therefore, from the above and (48), we have $$\frac{\partial C}{\partial \alpha_i} = \frac{c_i \mu_i \sigma_i \Phi(k_i)}{R_i \phi(k_i)} \left\{ P[T_i \le \beta_i] - P[T_i + \tau_i \le \beta_i] + \frac{\bar{f}_i E\phi(Y_i)}{\text{sd}(\tau_i)} \frac{\partial}{\partial \bar{f}_i} E(\tau_i) + E[Y_i \phi(Y_i)] \frac{\partial}{\partial \bar{f}_i} \text{sd}(\tau_i) \right\}^{-1}, \quad (53)$$

where $$\frac{\partial}{\partial \bar{f}_i} E(\tau_i) \text{ and } \frac{\partial}{\partial \bar{f}_i} \text{sd}(\tau_i)$$

follow (42) (with j replaced by i).

Similarly, we can derive the sensitivity of the optimal value w.r.t. $\beta_i$, the other parameter in the serviceability constraint. Analogous to (48) and (51), we have $$\frac{\partial C}{\partial \beta_i} = \frac{\partial}{\partial k_i}[\hat{c}\mu_i + c_i \sigma_i H(k_i)] \cdot \frac{\partial k_i}{\partial \bar{f}_i} \frac{\partial \bar{f}_i}{\partial \beta_i} = -\frac{c_i \mu_i \sigma_i \Phi(k_i)}{R_i \phi(k_i)} \frac{\partial \bar{f}_i}{\partial \beta_i} \quad (54)$$

and $$\frac{\partial \bar{f}_i}{\partial \beta_i} = \frac{\text{pdf}_{T_i}(\beta_i) - \bar{f}_i \left( \text{pdf}_{T_i}(\beta_i) - \frac{\partial}{\partial \beta_i} P[T_i + \tau_i \le \beta_i] \right)}{P[T_i \le \beta_i] - P[T_i + \tau_i \le \beta_i]} \quad (55)$$

$$= \frac{f_i \text{pdf}_{T_i}(\beta_i) + \bar{f}_i \frac{\partial}{\partial \beta_i} P[T_i + \tau_i \le \beta_i]}{P[T_i \le \beta_i] - P[T_i + \tau_i \le \beta_i]}$$

where $\text{pdf}_{T_i}(\beta_i)$ denotes the density function of $T_i$ evaluated at $\beta_i$. (In case of discrete distributions, replace the pdf's by the pmf's.) Similar to (52), writing $Y_i := [\beta_i - T_i - E(\tau_i)]/\text{sd}(\tau_i)$, we have $$\frac{\partial}{\partial \beta_i} P[T_i + \tau_i \le \beta_i] =$$

$$\frac{1}{\text{sd}(\tau_i)} \left\{ E[\phi(Y_i)] \left[ 1 - \frac{\partial}{\partial \beta_i} E(\tau_i) \right] - E[Y_i \phi(Y_i)] \frac{\partial}{\partial \beta_i} \text{sd}(\tau_i) \right\}$$

$$= \frac{E[\phi(Y_i)]}{\text{sd}(\tau_i)} - \frac{1}{\text{sd}(\tau_i)} \frac{\partial \bar{f}_i}{\partial \beta_i} \left\{ E[\phi(Y_i)] \frac{\partial}{\partial \bar{f}_i} E(\tau_i) + E[Y_i \phi(Y_i)] \frac{\partial}{\partial \bar{f}_i} \text{sd}(\tau_i) \right\}$$

Hence, substituting the above first into (55) and then into (54), we have $$\frac{\partial C}{\partial \beta_i} = -\frac{c_i \mu_i \sigma_i \Phi(k_i)}{R_i \phi(k_i)} \left\{ f_i \text{pdf}_{T_i}(\beta_i) + \bar{f}_i \frac{E[\phi(Y_i)]}{\text{sd}(\tau_i)} \right\}.$$

$$\left\{ P[T_i \le \beta_i] - P[T_i + \tau_i \le \beta_i] + \frac{\bar{f}_i E\phi(Y_i)}{\text{sd}(\tau_i)} \frac{\partial}{\partial \bar{f}_i} E(\tau_i) + E[Y_i \phi(Y_i)] \frac{\partial}{\partial \bar{f}_i} \text{sd}(\tau_i) \right\}^{-1}.$$

Comparing (50) and (56), we note that the two shadow prices are related as follows:

$$\frac{\partial C}{\partial \beta_i} = -\frac{\partial C}{\partial \alpha_i} \left\{ f_i \text{pdf}_{T_i}(\beta_i) + \bar{f}_i \frac{E[\phi(Y_i)]}{\text{sd}(\tau_i)} \right\}.$$

In particular, note that the optimal value is increasing in $\alpha_i$ and decreasing in $\beta_i$. (The factor in the braces is non-negative.)

7 Implementation

7.1 The Performance Routine

Given the input data and the safety factors for all (internal) stores, the analysis in §3 yields the performance of every store in the network, in terms of its actual lead time, the mean and variance of demand over the lead time, the base-stock level, fill rate, and stockout probability. Inventory breakdown at each store, between the pipeline part and the finished-goods part, can also be specified.

The performance evaluation is accomplished through first computing the actual lead times at all stores, starting from the "leaf nodes" in the BOM tree—the external suppliers, working through all levels of the BOM until reaching the end stores. This part consists of three routines that handle, respectively, the convolution, the mixture and the residual operations on the lead-time distributions; refer to (19). (Implementing the exact calculation via (17) and (18) would require one more routine that handles the max operation.)

The performance of each store is then computed following the formulas in §3.3 and §3.6, respectively for the internal and the end stores.

7.2 The Iterative Scheme

Equating the right hand side of (31) to zero, we obtain the first-order (necessary) condition for optimality. Writing the part in curly braces (the two summations) in (31) as $\psi_j$, we have $$\Phi(k_j) = \frac{R_j \phi(k_j)}{c_j \mu_j \sigma_j} \psi_j.$$

which can be rewritten as follows, with, as before, $g(k_j)=\phi(k_j)/\bar{\Phi}(k_j)$;

$$\bar{\Phi}(k_j) = \frac{c_j \mu_j \sigma_j}{c_j \mu_j \sigma_j + R_j g(k_j) \Psi_j}, j \notin S_0. \quad (57)$$

Since $p_j = \bar{\Phi}(k_j)$, we can rewrite the above as $$p_j = \frac{c_j \mu_j \sigma_j}{c_j \mu_j \sigma_j + R_j g(k_j) \Psi_j}, j \notin S_0. \quad (58)$$

which has the intuitive interpretation that at optimality, the stockout probability at each store j, $p_j$, should be set at the right hand side of (58). (Should this right hand side be greater than I or less than 0, then, pj should be set at 1 or 0, respectively.)

Note that $\psi_j$ is a function of $k:=(k_i)_{i \notin S_o}$. Alternatively, it can also be viewed as a function of $p:=(b_i)_{i \notin S_o}$ or $\bar{f}:=(\bar{f}_i)_{i \notin S_o}$. Suppose for all $j \notin S_o$, $\psi_j$ is decreasing in p (or, equivalently, increasing in k and decreasing in $\bar{f}$). Then, increasing p (componentwise) will increase the right hand side of (58). This way, if we start from $p^0=0$ (or close to 0), repeatedly applying the iteration in (58) will result in an increasing sequence: $p^n \leq p^{n+1}$. This way, the iteration scheme is guaranteed to converge.

7.3 The Optimization Routine

To minimize the objective function C(k) [see (29)], we use two approaches. The first one is to search for the zero gradient point directly, by equating the right hand side of (31) to zero, as discussed in detail in §7.2. The second approach is to use the conjugate gradient method (Press et al [12]), a standard technique for nonlinear optimization. Briefly, the method works as follows. Let the superscript n index the steps in the optimization. Let g and h denote two vectors, of the same dimension as k. Let $\nabla C(k)$ denote the gradient (vector) of C at k. Suppose the n-th step is done. In the next step (n+1), the algorithm starts with a line search, along the direction of $h^n$:

$$\min_{\lambda} C(k^n + \lambda h^n),$$

to yield $k^{n+1}$; it then does the updating:

$$g^{n+1} = -\nabla C(k^{n+1}), h^{n+1} = g^{n+1} + \frac{g^{n+1} \cdot g^{n+1}}{g^n \cdot g^n} h^n.$$

The algorithm iterates in this fashion until convergence, i.e., when a prespecified tolerance, say, the relative difference between the objective value of two consecutive steps, is achieved. (The two sequences of directions, g and h, as specified above satisfies both orthogonality and conjugacy, hence the name "conjugate gradient".) At each step n, the algorithm requires the functional value, $C(k^n)$, and the gradient, $\nabla C(k^n)$. These are returned by the performance routine.

The conjugate gradient method always converges. But it appears to be significantly slower that the simple iteration scheme in §7.2.

The objective function in (29) seems to have a rather complicated surface, and both approaches in general lead to a local optimum, which depends on the initial solution. When the iteration scheme converges, it usually gives the same solution as the conjugate gradient method, provided both start with the same initial solution. Typically, we find that the local optimum is directly proportionate to the initial input, in terms of stockout probabilities (which relate to the safety factors via (11). So we usually input a set of small stockout probabilities, below 5%, say, run the algorithms for each input, and then choose the best solution.

8 Demonstration

8.1 Overview

This invention was implemented using C++ programming language and is referred as Inventory Optimizer. In this section, we show how the Inventory Optimizer works and explain the results using sample examples. The objective of the Inventory Optimizer is to determine reorder points that keep inventory costs in a supply chain to minimal levels while attaining specified customer service levels.

The Inventory Optimizer assumes a one-for-one replenishment mechanism; it does not address the question of selecting order sizes at each location.

In discussing how the Inventory Optimizer works, the following terms are used:

Input buffer is a buffer that holds the components of a single level BOM.

Output buffer is a buffer that holds finished goods of a single level BOM.

Inventory position or reorder point is ( (on-hand+on-order)−backorder). When position falls below (not on) a specified reorder point, a replenishment order is issued.

Nominal lead time is the time it takes to supply a buffer when inventory is available. For an input buffer, nominal lead time is the shipping time of the item from its supplier. For an output buffer, nominal lead time is the manufacturing or assembly time.

Actual lead time is the average amount of time that it takes to supply a buffer, taking into account stockout delays that add to nominal lead time.

Safety stock is the amount of a product held in stock to cover the variability of demand over the replenishment lead time, in order to meet customer service level requirements.

A work-in-process (WIP) is an order in transition from one buffer to another. The order may be moving from an input buffer to an output buffer within a single node, or from an output buffer in one node to an input buffer in another node.

8.2 The Sample Model

The discussion which follows refers to the supply chain network shown in FIG. 1, Numeral 10.

In this supply chain:

The external customer orders ModelA computers, which are shipped from a distribution center in Atlanta.

Atlanta obtains fully-assembled ModelA computers from a manufacturing plant in Cleveland.

Cleveland manufactures ModelAs using power supplies and motherboards obtained from a manufacturing site in Sacramento.

Sacramento obtains the chips it needs to assemble motherboards from a manufacturing plant in Guadalajara. Power supplies are obtained from an external supplier which is not depicted in this supply chain.

To keep the example as simple as possible, there is only one external customer and one product in this model.

Assume the following properties are defined for the supply chain network:

Transportation time between any two locations is 24 hours.

Each manufacturing site takes 24 hours to assemble a product.

The Atlanta distribution center requires 24 hours to process finished goods it receives from Cleveland.

Customer service requirements are for a due date of 2 days from the time the order is placed, and this service level to be met 90% of the time.

Customer demand is defined as aggregated over two 30 day periods. Demand is 120 for the first 30 day period, and 175 for the second 30 day period.

8.3 The Optimization Procedure

The following is a simplified account of how the Inventory Optimizer goes about determining optimal inventory amounts:

83.1 Populate demand

The Inventory Optimizer begins by calculating the total customer demand, per day, during each demand period defined. It populates demand for each input and output buffer at the manufacturing and distribution nodes in the supply chain network. The Optimizer takes into account the variability of demand levels when demand is defined as a probability distribution. To illustrate how the Optimizer populates demand, FIG. 2, Numeral 12, shows a demand matrix for a customer whose demand is defined at different levels over 7daily periods:

It's easiest to explain the matrix by starting at Day 5:

On Day 5, external customer demand is for 5 ModelA computers.

It takes 24 hours to ship the product from Atlanta's output buffer to the customer, so there is a demand of 5 on Day 4 in the Atlanta output buffer.

There is a processing delay of 24 hours in Atlanta, so Atlanta's input buffer must have the product available on Day 3.

Atlanta obtains the product from Cleveland's output buffer, and it takes 24 hours to ship the product from Cleveland to Atlanta. So the Cleveland output buffer has a demand of 5 on Day 2.

Assembly time in Cleveland is 24 hours, so the demand of 5 is set for the input buffer on Day 1.

We've simplified the example in FIG. 2 by setting a fixed demand for each day. A more realistic approach is to specify demand as variable, using a statistical distribution. The Inventory Optimizer takes variability of demand into account when populating demand for the supply chain's buffers.

8.3.2 Set Fill Rate for Internal Buffers

Fill rate can be any value from 0.0 to 1.0 (0–100%). For the first iteration, the Optimizer sets fill rate to 0.95. This is an arbitrary starting point, and is used for all models. The fill rate is moved up or down in later iterations.

Begin Iteration

Now the Inventory Optimizer begins an iterative process, where it experiments with different inventory levels to come up with the least costly set that satisfies customer service level requirements.

83.3 Calculate Actual Lead Time for all Buffers

The Inventory Optimizer begins by calculating actual lead times for the leaf buffers in the model. A leaf buffer is one that does not depend on any other suppliers (upstream buffers) in the model. The actual lead time of leaf buffers is equal to its nominal lead time. In FIG. 3, the SiliconChip buffer in Guadalajara is a leaf buffer, as is the PowerSupply buffer in Sacramento.

After setting lead time for leaf buffers, the Inventory Optimizer works its way towards the end buffer, which is the buffer that supplies an external customer. In this model, the ModelA buffer in Atlanta is the end buffer.

The calculated actual lead time is derived as a function of:

A buffer's nominal lead time

The fill rate of the supplying buffers

The actual lead time of the supplying buffers

Here are a couple of examples (see FIG. 3, numeral 14):

1. Guadalajara contains a single buffer, the leaf buffer for SiliconChips. The actual lead time is the assembly time of 24 hours.

2. Sacramento has 3 buffers. There are output buffers for MotherBoards and PowerSupplys, and a component input buffer for SiliconChips.

(a) The PowerSupply buffer is a leaf buffer with a nominal and actual lead time of 24 hours. The actual lead time for the SiliconChip buffer is computed as follows:

Nominal lead time is 24 hours, the time it takes to transport this component from its supplier (Guadalajara).

Assuming that the component will be available in Guadalajara 95% of the time (fill rate of 0.95), then 5% of the time the buffer will need to be replenished. Replenishing the SiliconChip buffer in Guadalajara takes 24 hours, the manufacturing time defined for this buffer. So when replenishment is needed in Guadalajara, lead time is 48 hours (24 hour transport time plus 24 hour manufacturing time). The Optimizer makes the following calculation:

24.0 hour lead time 95% of the time =24.0 * 0.95=22.8 hours plus 48.0 hour lead time 5% of the time =48.0 * 0.05=2.4 hours Summed together, the calculated actual lead time works out to 25.2 hours.

(b) For the MotherBoard buffer in Sacramento, actual lead time is computed as:

Nominal lead time is 24.0 hours 95% of the time

If the SiliconChip component is not available in the supplier's (Guadalajara) buffer, the actual lead time to replenish this buffer is 25.2 hours. The lead time for SiliconChips in this instance is 49.2 hours:

25.2 plus 24.0 ( nominal lead time). This occurs about 5% of the time:

24.0 hour lead time 95% of the time =24.0 * 0.95=22.8 hours plus 49.2 hour lead time 5% of the time =49.2 * 0.05=2.46 hours For a total of 25.26 hours calculated actual lead time.

Again, this is a simplified version of the calculations made by the Inventory Optimizer.

The actual calculations involve complex mathematical formulas described in the earlier section.

8.3.4 Determine Fill Rate for End Buffer to meet customer service level requirements The Atlanta distribution center contains the end or external buffer in the model shown in FIG. 1. That is, it serves an external customer and does not supply any buffers in the supply chain network. The Inventory Optimizer computes the fill rate of end buffers according to:

The actual lead time of the buffer

The transportation time to customers

The customer's service level requirements

In the sample supply chain network, the required customer service level is 90% of orders filled within 2 days (48 hours). Transportation time from the distribution center (Atlanta) to the customer is 24 hours. The actual lead time of Atlanta's Model A buffer was determined in step 3; for this example, assume it's 26 hours.

In the following discussion:

$f$ represents the fill rate to be determined

W represents the customer wait time for order fulfillment

P represents probability

W is 24 hours (the transport time from Atlanta) $f$% of the time.

W is 50 hours (transport plus actual lead time) the rest of the time (100–$ff$%).

The required service level is 48 hours wait time, 90% of the time. The Optimizer uses the following equation to represent this:

$$P(W>=48)=0.9$$

Substituting the wait times of 24 and 50 hours as probability functions, the Optimizer uses the following equation to derive f:

$$(P(24<=48)*f)+(P(50<=48)*(1-f)=0.9$$

This is read as "the probability that 24<=48, multiplied by $f$, plus the probability that 50 is <=4, multiplied by f, is equal to 0.9 (90%)."

Resulting in:

$$1*f+0*f=0.9$$

The probability that 24 is less than 48 is 100%, or 1, and the probability that 50 is less than 4 is 0%, or 0.

Solving for $f$, the fill rate is 0.9.

8.3.5 Set inventory level for each buffer in the supply chain network

With the demand, fill rate, and actual lead time determined for each buffer, the Optimizer sets inventory levels for each buffer in the supply chain network using the following algorithms:

1. A Safety Factor is set to correspond to the fill rate of the buffer. The Optimizer converts fill rate to a safety factor, setting it to the number of standard deviations you need to keep in order to meet the fill rate. The higher the fill rate, the greater the safety factor required. The Inventory Optimizer uses a formula to calculate safety factor from the fill rate, mean demand, and variability of demand over the actual lead time.

2. Safety stock of an item is the amount of inventory kept on hand to cover the variability in demand over the lead time. The more safety stock you keep, the greater the variability you can cover. Safety stock is equal to the safety factor multiplied by the standard deviation of demand over the actual lead time. Safety stock is the amount you need to keep in order to meet the required fill rates, and is equal to On-hand inventory—backorder.

3. Work in Process (WIP) is calculated as the mean demand over the nominal lead time.

4. Reorder Point (ROP) is mean demand over the actual lead time, plus safety stock.

Reorder point cannot be a fraction, so any fractional amounts are rounded up to the next whole integer. On-hand inventory is then adjusted so that the mean demand over actual lead time, plus on-hand, is equal to the reorder point.

8.3.6 Determine the cost of inventory

Using the inventory levels determined in step 5, the Inventory Optimizer determines total inventory cost.

For each buffer in the supply chain, the cost of on-hand inventory is derived by multiplying the product price by the number of units on-hand.

The cost of each product when it is a Work in Process is determined by averaging the price of the finished good and the component costs of the product:

(Unit Price of Finished Good +Unit Price of each Component in BOM)/2

Total inventory cost is the sum of WIP and on-hand inventory costs for all buffers in the supply chain.

8.3.7 Use an optimization routine to set fill rate for internal buffers

At this point, the Inventory Optimizer has determined a set of reorder points that can achieve the customer's required service level at the cost calculated in the above section. In the first iteration, an arbitrary fill rate was set. Now, the Optimizer executes optimization routines to search for a different set of fill rates to lower the cost of inventory while retaining service level requirements. It then re-calculates the actual lead-time using the new set of fill rates and repeats until inventory cost stops decreasing.

8.4 Inventory Optimizer Report

The Inventory Optimizer produces a report describing the results of the optimization procedure. The report is saved in a file.

Report Contents

The Inventory Optimization report is divided into three sections:

A. Optimizer Results is a summary showing the average amount of inventory on hand at each location, and the capital cost of the inventory.

B. Parts Inventory Statistics show inventory amounts for each buffer in every manufacturing and distribution node.

C. Capital Inventory Statistics shows inventory costs for each part, both as a function of WIP and of on-hand inventory.

We'll look at a sample Inventory Optimization report.

8.4.1 The Optimizer Summary Results Section

The first section in the Inventory Optimization report is a summary (See FIG. 4, numeral 16):

Each manufacturing and distribution location in the supply chain is listed in the summary. Parts Inventory shows the total number of parts stored at each location, on average. Capital Inventory lists inventory costs at each location.

Turnover Estimates

The Inventory Optimizer also estimates the amount of inventory turnover. The Optimizer assumes that all customer orders are shipped. Equating the customer demand specified in the model to the number of shipments, the formula used to calculate turnover is:

turns=(annual shipments * cost)/(average inventory cost)

Average inventory cost for each buffer is described in section C of the Inventory Optimization report.

8.4.2 Parts Inventors Statistics

Section B of the Inventory Optimization report describes inventory for each buffer in the supply chain network. The report distinguishes between on-hand inventory (finished goods) and work-in-process (WIP) inventory for each buffer.

FIG. 5, Numeral 18 is excerpt from section B showing the Atlanta and Cleveland nodes.

Section B includes the following columns:

Part Number identifies a product or component.

Store is synonymous with buffer and identifies the buffer as either an input buffer (i), output buffer (o), or a field buffer (fld). The field buffer represents products that are enroute to external customers.

ROP (Reorder Point) shows the reorder point the Inventory Optimizer has determined as optimal for this buffer. The model is updated to reflect this reorder point.

WIP shows the estimated work in process for this part at this location.

On Hand estimates the amount of on-hand inventory in the buffer.

Total is the sum of WIP and On Hand.

The sum of the amounts in the Total column should equal the total Parts Inventory in section A of the report.

8.43 Capital Inventory Statistics

Section C of the Inventory Optimization report estimates inventory costs for each part in the supply chain network, both as a function of WIP and of on-hand inventory. FIG. 6, Numeral 20 is excerpt from section B showing the Atlanta and Cleveland nodes:

Sections C lists the unit cost for each part in the supply chain, and the estimated capital inventory cost of the part.

Cost of On-Hand Inventory. The cost of a part is input by the user.

For each buffer in the supply chain, the capital inventory cost for on-hand parts is derived by multiplying the product price by the estimated number of units on-hand. Refer to report section B for the estimated number of units on-hand.

WIP Costs. WIP inventory refers to orders that are in transition from one buffer to another. The WIP cost of inventory is determined by averaging its on-hand and component costs.

(Unit Price of Finished Good+Unit Price of each Component in BOM)/2

For example, look at the costs associated with the buffers in Cleveland:

The on-hand(selling) price of a ModelA is $500.00. The BOM for a ModelA consists of one Motherboard and one PowerSupply, which Cleveland obtains from Sacramento. You can determine the cost of these components by looking at the On Hand cost in the report The MotherBoard costs $200.00, and the PowerSupply $75.00. The unit WIP cost for the ModelA output buffer in Cleveland is thus:

($500(FG)+$200(MotherBoard)+$75(PowerSupply)/2= $775.00/2=$387.50

Capital WIP cost is the unit WIP cost multiplied by the estimated number of WIP for the buffer.

9 Machine Realization of the Present Invention

The class of computers know as Von Neumann computers comprise a memory, a bus, zero or more input/output devices, and a processing unit containing an arithmetic/logic unit, a control unit, and a program counter. The program counter may be considered to be part of the control unit. The bus connects the memory, the input/output (I/O) devices, and the control unit.(See FIG. 7, numeral 22).

The memory contains storage locations that have addresses. The addresses are usually numerical. Data at each storage location can be read and, usually, written. Every Von Neumann machine has some memory that can be written, while some of the memory may be read-only. Preferably, the method of the present invention is stored in memory.

The bus is able to represent the address of a memory location, the contents of a memory location, and whether the memory location is to be written or read. It may also be able to represent conditions such as changes in the status of I/O devices. /par The I/O devices are able to receive instructions via the bus, are able to send status information via the bus, and are able to receive data from the bus and write data on the bus when signaled to do so by the bus. The I/O devices may be able to control the bus, but this is not required. Input devices are able to read data stored in the devices of read from external media and place that data on the bus. Output devices are able to write data from the bus to storage in the device or to external media. Some I/O devices are able to do both. In the present invention the user input information is loaded into the input device.

The processing unit (which may also be referred to as a central processing unit, CPU, or micro-processor), contains an arithmetic/logic unit, a program counter and a control unit (which may also be referred to as an instruction unit). The control unit is what distinguishes Von Neumann computers from calculation. The method of the present invention is typically executed by the arithmetic/logic unit and an output in the form of e.g. FIGS. 4, 5, and 6 are displayed on an appropriate output device.

The processing unit is able to put address on the bus, read data from the bus, and write data to the bus. In this way, the processing unit is able to cause data to be read from specified memory locations or I/O devices or write data to specified memory locations or I/O devices.

The processing unit is able to read data from memory locations and treat the data as instructions that control the actions of the control unit and arithmetic/logic unit. At any point in time after the initialization of the computer, the program counter will contain the address of a memory location. In the computer's instruction Cycle, the processing unit will read the instruction stored at the location specified by the program counter, increment the address in the program counter so that it contains the address of the instruction in memory that follows the instruction just read, and execute the instruction just read.

The processing unit generally has a relatively small amount of storage which can represent the contents of one or more memory locations. This storage is referred to as the register or registers.

The instruction can cause any of the following to happen:
read data from memory or an I/O device into a register;
write data* from a register to memory of an I/O device;
perform an arithmetic or logic calculation using data in one or more registers and/or (optionally) memory locations or I/O devices and writing the result to a register or (optionally) memory locations or I/O devices;
cause the contents of the program counter to be changed, optionally storing the previous value in a register or memory.

Whether the contents of the program counter are changed can be based on the result of an arithmetic or logical calculation or based on a value in a register. This allows different sequences of instructions to be executed.

This describes the fundamental properties of a Von Neumann computer. Many extensions are possible, for example, there may be instructions that read and write memory in one instruction cycle. There may be multiple buses. The I/O devices may be able take control of the bus (or Buses) and read or write data from or ti the memory without the processing unit's intervention or assistance. The processing unit may be able to fetch and execute multiple instructions concurrently which providing the abstraction that only one instruction is executed at a time. The computer may provide a virtual memory abstraction, meaning that virtual addresses are mapped to different physical addresses in the memory, allowing programs to use more memory addresses than the computer has in physical memory.

What is claimed:

1. A computer implemented method for optimizing inventory levels of products in a complex supply chain network including one or more internal nodes representing a supplier or a manufacturer and one or more external nodes representing a distributor or a retailer, the method comprising the steps of:
   a. providing information including a supply chain network topology indicating flow of products between said internal and external nodes of said supply chain network, an external demand for each of said external nodes and service level requirements for each of said external nodes;
   b. constructing a representative model of said supply chain network topology;
   c. deriving an internal demand for each of said internal nodes from said external demand;
   d. initializing fill rates for each of said internal nodes;
   e. estimating actual lead time for said internal and external nodes before said external demand for said products is fulfilled;
   f. determining said inventory levels for said internal and external nodes using said actual lead time and said internal demand;
   g. determining fill rates of said external nodes to meet said service level requirements;
   h. calculating a total inventory cost for all said products in said complex supply chain network;
   i. estimating gradient information of said total inventory cost with respect to said initialized fill rates of said internal nodes to find a minimum total inventory cost;
   j. applying an optimization routine to reset said fill rates of said internal nodes based on said gradient information; and
   k. repeating steps e through j, until optimal fill rates for said internal nodes are found; and
   l. modifying the inventory levels of product based on said found optimal fill rates for said internal nodes in minimizing said total inventory cost thereby optimizing inventory levels of products.

2. The method of claim 1, wherein step (b) constructs each of said nodes from a bill of materials.

3. The method of claim 2, wherein the bill of materials comprises time, location, and quantity information.

4. The method of claim 1, wherein step (a) further includes providing nominal lead time, said nominal lead time is defined for each of said internal nodes and external nodes.

5. The method of claim 4, wherein the nominal lead time is based on stochastic measurement.

6. The method of claim 4, wherein the nominal lead time is based on deterministic measurement.

7. The method of claim 1, wherein said external demand is based on stochastic measurement.

8. The method of claim 1, wherein said external demand is based on deterministic measurement.

9. The method of claim 1, wherein said service level requirements comprises a service level threshold and a fraction service percentage.

10. The method of claim 1, further comprising the step of setting minimal inventory levels by using gradient information of the total inventory cost of said representative model of the supply chain topology network with respect to a fill rate of each internal node.

11. The method of claim 1, comprising implementing the method by executing the steps on a computer.

12. The method of claim 1, wherein said step (e) said demand is performed by utilizing formula $$D_i(t) := \sum_{j \in S_{>i}} u_{ij} D_j(o_j + t) \quad t = 1, 2, 3, \ldots$$

where, $D_i(t)$ is the effective demand stream, $u_i$ is the usage and $o_j$ is the offset.

13. The method of claim 12, wherein said actual lead time is estimated using the nominal lead time and said fill rates information of said internal and external nodes, starting from the leaf nodes and continuing to their parent nodes, $$\tilde{L}_i = \begin{cases} L_i & \text{with probability } \pi_{0i} \\ L_i + \tau_j & \text{with probability } \pi_{ji}, j \in S_{>i}, \end{cases}$$

where $L_i$ is i's nominal lead time, $S_{>i}$ is the set of stores, $$\pi_{0i} := \left(1 + \sum_{h \in S_{>i}} \bar{f}_h / f_h\right)^{-1}, \text{ and } \pi_{ji} := (\bar{f}_j / f_j)\left(1 + \sum_{h \in S_{>i}} \bar{f}_h / f_h\right)^{-1},$$

assuming $f_h > 0$ for all $h \in S_{>i}$, if $f_j = 0$ for some $j \in S_{>i}$, let $L_i = L_i + T_j$ with probability 1.

14. The method of claim 13, wherein step (c) further including a step of calculating a mean and variance of said demand over said actual lead time, said step of calculating said mean and variance is performed by utilizing formulas:

$$\mu_i = \pi_{0i} E[D_i^{cum}(L_i)] + \sum_{j \in S_{>i}} \pi_{ji} E[D_i^{cum}(L_i + \tau_j)], \text{ and}$$

$$\sigma^2_i = \pi_{0i} E\{\text{Var}[D_i^{cum}(L_i) | L_i]\} + \sum_{j \in S_{>i}} \pi_{ji} E\{\text{Var}[D_i^{cum}(L_i + \tau_j) | (L_i + \tau_j)]\}.$$

where, $\mu_i$ is the mean of the cumulative demand over the lead time, and $D_i^{cum}$ is the cumulative demand and $\sigma^2_i$ is the variance.

15. The method of claim 14, wherein said inventory levels is determined by formulas:

$$E(I_i) = \sigma_i H(k_i), \text{ where } H(k_i) := k_i + G(k_i) = \int_{-\infty}^{k_i}(k_i - z)\phi(z)dz,$$

where, $E(I_i)$ is the inventory level, $\phi(Z)$ is the density function and $\sigma_i$ is the standard deviation.

16. The method of claim 15, wherein fill rates are determined in step (f) by formula:

$$f_i = \frac{\alpha_i - P[T_i + \tau_i \leq \beta_i]}{P[T_i \leq \beta_i] - P[T_i + \tau_i \leq \beta_i]}$$

where, $\alpha_i$ and $\beta_i$ is given data, $T_i$ is transportation time, $W_i$ is the waiting time to receive the order and the required service level is $$P[W_i \leq \beta_i] = f_i P[T_i \leq \beta_i] + (1 - f_i) P[T_i + \tau_i \leq \beta_i].$$

17. The method of claim 16, wherein step (g) calculates said total inventory cost is represented by formula $$C(k) = \left(\sum_{i \notin S_0} + \sum_{i \in S_0}\right)[\hat{c}_i \mu_i + c_i \sigma_i H(k_i)]$$

where, $c_i$ is the inventory capital at store i.

18. The method of claim 1, wherein said service level requirements are met by setting minimal inventory levels at each node that has external customer demand.

19. A computer program device readable by a machine, tangibly embodying a program of instructions executable by a machine to perform method steps for optimizing inventory levels of products in a complex supply chain network including one or more internal nodes representing a supplier or a manufacturer and one or more external nodes representing a distributor or a retailer, the method comprising the steps of:

a. providing information including a supply chain network topology indicating flow of products between said internal and external nodes of said supply chain network, an external demand for each of said external nodes and service level requirements for each of said external nodes;

b. constructing a representative model of said supply chain network topology;

c. deriving an internal demand for each of said internal nodes from said external demand;

d. initializing fill rates for each of said internal nodes;

e. estimating actual lead time for said internal and external nodes before said external demand for said products is fulfilled;

f. determining said inventory levels for said internal and external nodes using said actual lead time and said internal demand;

g. determining fill rates of said external nodes to meet said service level requirements;

h. calculating a total inventory cost for all said products in said complex supply chain network;

i. estimating gradient information of said total inventory cost with respect to said initialized fill rates of said internal nodes to find a minimum total inventory cost;

j. applying an optimization routine to reset said fill rates of said internal nodes based on said gradient information; and k. repeating steps e through j, until optimal fill rates for said internal nodes are found; and l. modifying the inventory levels of product based on said found optimal fill rates for said internal nodes in minimizing said total inventory cost thereby optimizing inventory levels of products.

\* \* \* \* \*